(12) United States Patent
Hirata

(10) Patent No.: US 9,167,111 B2
(45) Date of Patent: Oct. 20, 2015

(54) INFORMATION PROCESSING APPARATUS AND IMAGE FORMING APPARATUS

(71) Applicant: Oki Data Corporation, Minato-ku, Tokyo (JP)

(72) Inventor: Masaru Hirata, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/150,913

(22) Filed: Jan. 9, 2014

(65) Prior Publication Data

US 2014/0198344 A1    Jul. 17, 2014

(30) Foreign Application Priority Data

Jan. 11, 2013   (JP) ................................ 2013-003931

(51) Int. Cl.
  *H04N 1/00* (2006.01)
  *G06F 3/12* (2006.01)
  *G06F 3/14* (2006.01)
  *G06K 15/02* (2006.01)

(52) U.S. Cl.
  CPC ....... *H04N 1/00411* (2013.01); *H04N 1/00413* (2013.01); *H04N 2201/0094* (2013.01)

(58) Field of Classification Search
  None
  See application file for complete search history.

(56) References Cited

U.S. PATENT DOCUMENTS

| | | | | |
|---|---|---|---|---|
| 5,109,252 A * | 4/1992 | Schott, Jr. | ........................ | 399/83 |
| 6,005,679 A * | 12/1999 | Haneda | ......................... | 358/453 |
| 7,855,803 B2 * | 12/2010 | Nomoto et al. | .............. | 358/1.16 |
| 2002/0116573 A1 * | 8/2002 | Gold | .............................. | 711/111 |
| 2005/0193025 A1 * | 9/2005 | Mosek | .......................... | 707/200 |
| 2007/0226265 A1 * | 9/2007 | Nichols et al. | ................ | 707/200 |
| 2007/0236729 A1 * | 10/2007 | Yoda | ............................ | 358/1.15 |
| 2007/0294231 A1 * | 12/2007 | Kaihotsu | ........................... | 707/3 |
| 2008/0303823 A1 * | 12/2008 | Yanagawa | ..................... | 345/467 |
| 2009/0106666 A1 * | 4/2009 | Nomura | ........................ | 715/748 |
| 2009/0164489 A1 * | 6/2009 | Matsuda et al. | .............. | 707/100 |
| 2010/0166392 A1 * | 7/2010 | Ishii | .............................. | 386/122 |
| 2011/0102458 A1 * | 5/2011 | Takiguchi et al. | ............ | 345/629 |
| 2014/0123300 A1 * | 5/2014 | Jung et al. | ....................... | 726/26 |

FOREIGN PATENT DOCUMENTS

| | | |
|---|---|---|
| JP | 2005-352701 A | 12/2005 |
| JP | 2006-260197 A | 9/2006 |
| JP | 2010-003109 A | 1/2010 |

OTHER PUBLICATIONS

Fujita, Takuya, Gakuseikan no kyouyu wo mokuteki to shita sankoubunken-kanrishisutemu no. kaihatsu (Development of references management system intended for sharing between students). Japan: The Institute of Electronics, Information and Communication Engineers, Jul. 9, 2011, vol. 111, No. 141, pp. 29-34.

* cited by examiner

*Primary Examiner* — Beniyam Menberu
(74) *Attorney, Agent, or Firm* — Panitch Schwarze Belisario & Nadel LLP

(57) ABSTRACT

An information processing apparatus according to the invention includes a manipulating unit receiving an instruction based on a user manipulation and outputting an instruction signal, a setting unit for setting a rule for arranging a file or files based on the instruction signal from the manipulating unit, a detecting unit for detecting a file number, and a controlling unit for arranging the file or files based on the rule set with the setting unit in a case where the file number exceeds a threshold value.

9 Claims, 24 Drawing Sheets

FIG. 5

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top | 55 | False |
| 2 | INDIVIDUAL | FAX | #02 Extra | John#1 Private Top | 10 | False |
| 3 | INDIVIDUAL | COPY | #03 Normal | John#1 Private Top | 15 | False |
| 4 | INDIVIDUAL | FAX | #01 Fine | John#1 Private Top | 5 | False |
| 5 | INDIVIDUAL | SCAN | ScanToEmail #01 | John#1 Private Top/ScanToEmail | 6 | True |
| 6 | INDIVIDUAL | SCAN | ScanToEmail #02 | John#1 Private Top/ScanToEmail | 20 | True |
| 7 | INDIVIDUAL | SCAN | ScanToEmail #03 | John#1 Private Top/ScanToEmail | 3 | True |
| 8 | INDIVIDUAL | SCAN | ScanToEmail #04 | John#1 Private Top/ScanToEmail | 10 | True |
| 9 | INDIVIDUAL | SCAN | ScanToEmail #05 | John#1 Private Top/ScanToEmail | 11 | True |
| 10 | INDIVIDUAL | SCAN | ScanToEmail #06 | John#1 Private Top/ScanToEmail | 17 | True |
| 11 | INDIVIDUAL | SCAN | ScanToEmail #07 | John#1 Private Top/ScanToEmail | 0 | True |
| 12 | INDIVIDUAL | SCAN | ScanToEmail #08 | John#1 Private Top/ScanToEmail | 5 | True |
| 13 | INDIVIDUAL | SCAN | ScanToEmail #09 | John#1 Private Top/ScanToEmail | 7 | True |
| 14 | INDIVIDUAL | SCAN | ScanToEmail #10 | John#1 Private Top/ScanToEmail | 15 | True |

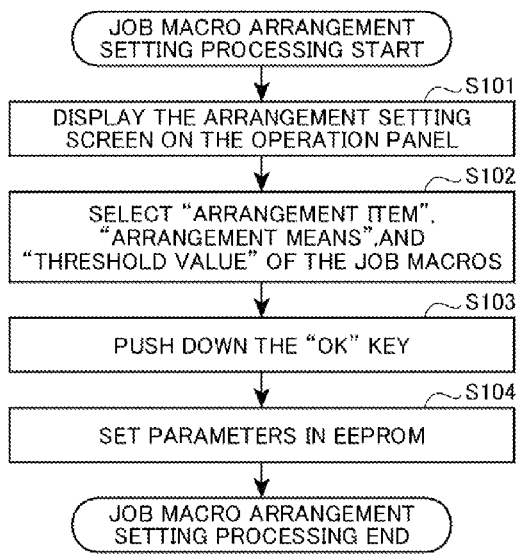

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top | 55 | False |
| 2 | INDIVIDUAL | COPY | #03 Normal | John#1 Private Top | 15 | False |
| 3 | INDIVIDUAL | FAX | #02 Extra | John#1 Private Top | 10 | False |
| 4 | INDIVIDUAL | FAX | #01 Fine | John#1 Private Top | 5 | False |
| 5 | INDIVIDUAL | COPY | #04 Extra Fine | John#1 Private Top | 1 | False |
| 6 | INDIVIDUAL | SCAN | ScanToEmail #01 | John#1 Private Top/ScanToEmail | 6 | True |
| 7 | INDIVIDUAL | SCAN | ScanToEmail #02 | John#1 Private Top/ScanToEmail | 20 | True |
| 8 | INDIVIDUAL | SCAN | ScanToEmail #03 | John#1 Private Top/ScanToEmail | 3 | True |
| 9 | INDIVIDUAL | SCAN | ScanToEmail #04 | John#1 Private Top/ScanToEmail | 10 | True |
| 10 | INDIVIDUAL | SCAN | ScanToEmail #05 | John#1 Private Top/ScanToEmail | 11 | True |
| 11 | INDIVIDUAL | SCAN | ScanToEmail #06 | John#1 Private Top/ScanToEmail | 17 | True |
| 12 | INDIVIDUAL | SCAN | ScanToEmail #07 | John#1 Private Top/ScanToEmail | 0 | True |
| 13 | INDIVIDUAL | SCAN | ScanToEmail #08 | John#1 Private Top/ScanToEmail | 5 | True |
| 14 | INDIVIDUAL | SCAN | ScanToEmail #09 | John#1 Private Top/ScanToEmail | 7 | True |
| 15 | INDIVIDUAL | SCAN | ScanToEmail #10 | John#1 Private Top/ScanToEmail | 15 | True |

FIG. 14A

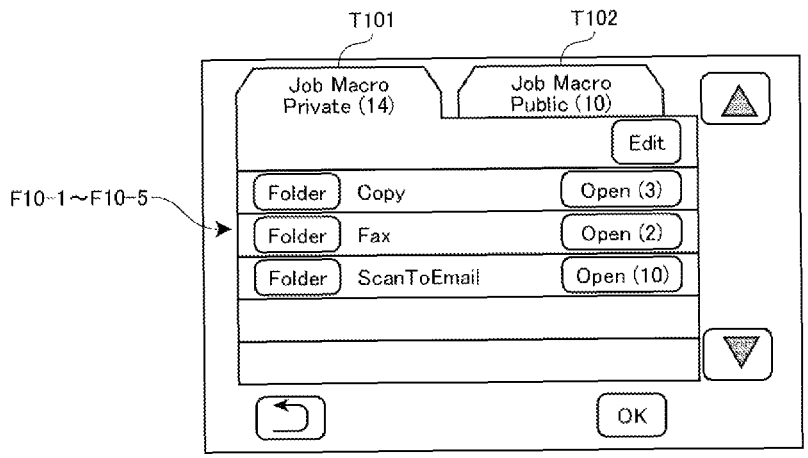

FIG. 14B

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top/Copy | 55 | True |
| 2 | INDIVIDUAL | COPY | #03 Normal | John#1 Private Top/Copy | 15 | True |
| 3 | INDIVIDUAL | COPY | #04 Extra Fine | John#1 Private Top/Copy | 1 | True |
| 4 | INDIVIDUAL | FAX | #01 Fine | John#1 Private Top/Fax | 5 | True |
| 5 | INDIVIDUAL | FAX | #02 Extra | John#1 Private Top/Fax | 10 | True |
| 6 | INDIVIDUAL | SCAN | ScanToEmail #01 | John#1 Private Top/ScanToEmail | 6 | True |
| 7 | INDIVIDUAL | SCAN | ScanToEmail #02 | John#1 Private Top/ScanToEmail | 20 | True |
| 8 | INDIVIDUAL | SCAN | ScanToEmail #03 | John#1 Private Top/ScanToEmail | 3 | True |
| 9 | INDIVIDUAL | SCAN | ScanToEmail #04 | John#1 Private Top/ScanToEmail | 10 | True |
| 10 | INDIVIDUAL | SCAN | ScanToEmail #05 | John#1 Private Top/ScanToEmail | 11 | True |
| 11 | INDIVIDUAL | SCAN | ScanToEmail #06 | John#1 Private Top/ScanToEmail | 17 | True |
| 12 | INDIVIDUAL | SCAN | ScanToEmail #07 | John#1 Private Top/ScanToEmail | 0 | True |
| 13 | INDIVIDUAL | SCAN | ScanToEmail #08 | John#1 Private Top/ScanToEmail | 5 | True |
| 14 | INDIVIDUAL | SCAN | ScanToEmail #09 | John#1 Private Top/ScanToEmail | 7 | True |
| 15 | INDIVIDUAL | SCAN | ScanToEmail #10 | John#1 Private Top/ScanToEmail | 15 | True |

FIG. 15A

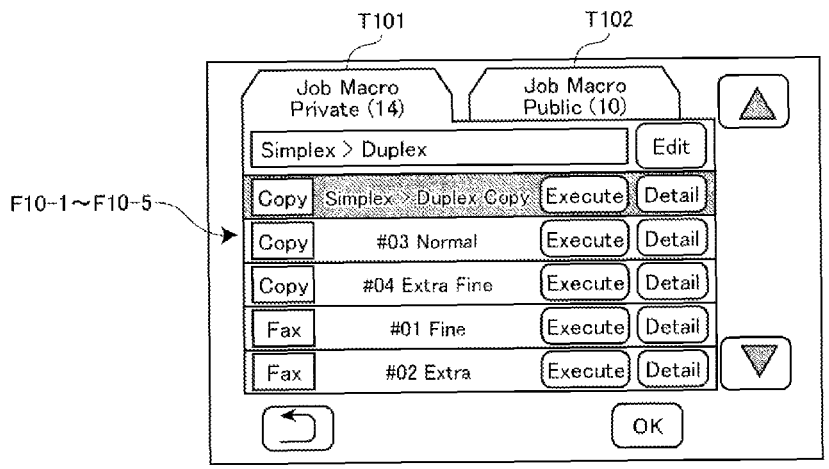

FIG. 15B

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top | 55 | True |
| 2 | INDIVIDUAL | COPY | #03 Normal | John#1 Private Top | 15 | True |
| 3 | INDIVIDUAL | COPY | #04 Extra Fine | John#1 Private Top | 1 | True |
| 4 | INDIVIDUAL | FAX | #01 Fine | John#1 Private Top | 5 | True |
| 5 | INDIVIDUAL | FAX | #02 Extra | John#1 Private Top | 10 | True |
| 6 | INDIVIDUAL | SCAN | ScanToEmail #01 | John#1 Private Top/ScanToEmail | 6 | True |
| 7 | INDIVIDUAL | SCAN | ScanToEmail #02 | John#1 Private Top/ScanToEmail | 20 | True |
| 8 | INDIVIDUAL | SCAN | ScanToEmail #03 | John#1 Private Top/ScanToEmail | 3 | True |
| 9 | INDIVIDUAL | SCAN | ScanToEmail #04 | John#1 Private Top/ScanToEmail | 10 | True |
| 10 | INDIVIDUAL | SCAN | ScanToEmail #05 | John#1 Private Top/ScanToEmail | 11 | True |
| 11 | INDIVIDUAL | SCAN | ScanToEmail #06 | John#1 Private Top/ScanToEmail | 17 | True |
| 12 | INDIVIDUAL | SCAN | ScanToEmail #07 | John#1 Private Top/ScanToEmail | 0 | True |
| 13 | INDIVIDUAL | SCAN | ScanToEmail #08 | John#1 Private Top/ScanToEmail | 5 | True |
| 14 | INDIVIDUAL | SCAN | ScanToEmail #09 | John#1 Private Top/ScanToEmail | 7 | True |
| 15 | INDIVIDUAL | SCAN | ScanToEmail #10 | John#1 Private Top/ScanToEmail | 15 | True |

FIG. 16A

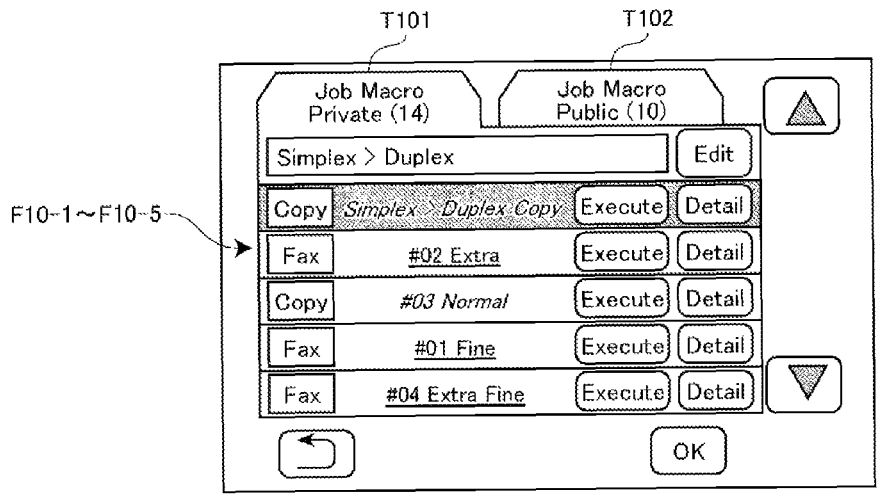

FIG. 16B

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top | 55 | True |
| 2 | INDIVIDUAL | FAX | #02 Extra | John#1 Private Top | 10 | True |
| 3 | INDIVIDUAL | COPY | #03 Normal | John#1 Private Top | 15 | True |
| 4 | INDIVIDUAL | FAX | #01 Fine | John#1 Private Top | 5 | True |
| 5 | INDIVIDUAL | COPY | #04 Extra Fine | John#1 Private Top | 1 | True |
| 6 | INDIVIDUAL | SCAN | ScanToEmail #01 | John#1 Private Top/ScanToEmail | 6 | True |
| 7 | INDIVIDUAL | SCAN | ScanToEmail #02 | John#1 Private Top/ScanToEmail | 20 | True |
| 8 | INDIVIDUAL | SCAN | ScanToEmail #03 | John#1 Private Top/ScanToEmail | 3 | True |
| 9 | INDIVIDUAL | SCAN | ScanToEmail #04 | John#1 Private Top/ScanToEmail | 10 | True |
| 10 | INDIVIDUAL | SCAN | ScanToEmail #05 | John#1 Private Top/ScanToEmail | 11 | True |
| 11 | INDIVIDUAL | SCAN | ScanToEmail #06 | John#1 Private Top/ScanToEmail | 17 | True |
| 12 | INDIVIDUAL | SCAN | ScanToEmail #07 | John#1 Private Top/ScanToEmail | 0 | True |
| 13 | INDIVIDUAL | SCAN | ScanToEmail #08 | John#1 Private Top/ScanToEmail | 5 | True |
| 14 | INDIVIDUAL | SCAN | ScanToEmail #09 | John#1 Private Top/ScanToEmail | 7 | True |
| 15 | INDIVIDUAL | SCAN | ScanToEmail #10 | John#1 Private Top/ScanToEmail | 15 | True |

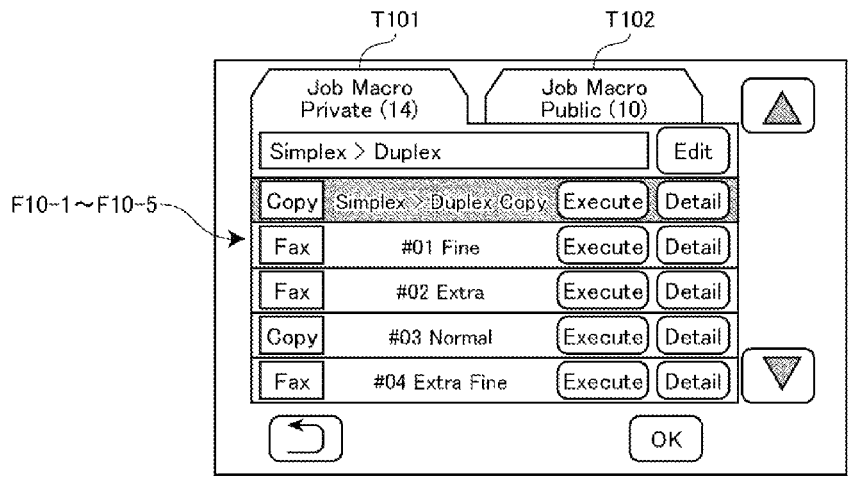

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top | 55 | True |
| 2 | INDIVIDUAL | FAX | #01 Fine | John#1 Private Top | 5 | True |
| 3 | INDIVIDUAL | FAX | #02 Extra | John#1 Private Top | 10 | True |
| 4 | INDIVIDUAL | COPY | #03 Normal | John#1 Private Top | 15 | True |
| 5 | INDIVIDUAL | COPY | #04 Extra Fine | John#1 Private Top | 1 | True |
| 6 | INDIVIDUAL | SCAN | ScanToEmail #01 | John#1 Private Top/ScanToEmail | 6 | True |
| 7 | INDIVIDUAL | SCAN | ScanToEmail #02 | John#1 Private Top/ScanToEmail | 20 | True |
| 8 | INDIVIDUAL | SCAN | ScanToEmail #03 | John#1 Private Top/ScanToEmail | 3 | True |
| 9 | INDIVIDUAL | SCAN | ScanToEmail #04 | John#1 Private Top/ScanToEmail | 10 | True |
| 10 | INDIVIDUAL | SCAN | ScanToEmail #05 | John#1 Private Top/ScanToEmail | 11 | True |
| 11 | INDIVIDUAL | SCAN | ScanToEmail #06 | John#1 Private Top/ScanToEmail | 17 | True |
| 12 | INDIVIDUAL | SCAN | ScanToEmail #07 | John#1 Private Top/ScanToEmail | 0 | True |
| 13 | INDIVIDUAL | SCAN | ScanToEmail #08 | John#1 Private Top/ScanToEmail | 5 | True |
| 14 | INDIVIDUAL | SCAN | ScanToEmail #09 | John#1 Private Top/ScanToEmail | 7 | True |
| 15 | INDIVIDUAL | SCAN | ScanToEmail #10 | John#1 Private Top/ScanToEmail | 15 | True |

FIG. 18A

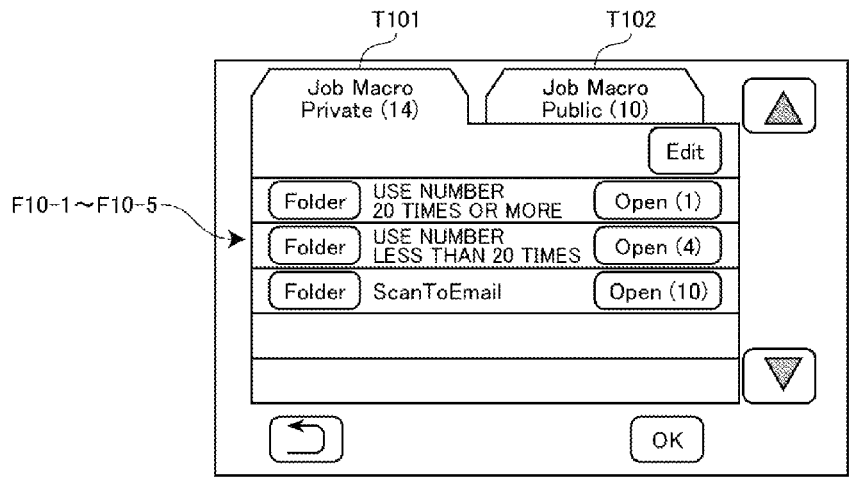

FIG. 18B

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top/ USE NUMBER 20 TIMES OR MORE | 55 | True |
| 2 | INDIVIDUAL | COPY | #03 Normal | John#1 Private Top/ USE NUMBER LESS THAN 20 TIMES | 15 | True |
| 3 | INDIVIDUAL | FAX | #02 Extra | John#1 Private Top/ USE NUMBER LESS THAN 20 TIMES | 10 | True |
| 4 | INDIVIDUAL | FAX | #01 Fine | John#1 Private Top/ USE NUMBER LESS THAN 20 TIMES | 5 | True |
| 5 | INDIVIDUAL | COPY | #04 Extra Fine | John#1 Private Top/ USE NUMBER LESS THAN 20 TIMES | 1 | True |
| 6 | INDIVIDUAL | SCAN | ScanToEmail #01 | John#1 Private Top/ScanToEmail | 6 | True |
| 7 | INDIVIDUAL | SCAN | ScanToEmail #02 | John#1 Private Top/ScanToEmail | 20 | True |
| 8 | INDIVIDUAL | SCAN | ScanToEmail #03 | John#1 Private Top/ScanToEmail | 3 | True |
| 9 | INDIVIDUAL | SCAN | ScanToEmail #04 | John#1 Private Top/ScanToEmail | 10 | True |
| 10 | INDIVIDUAL | SCAN | ScanToEmail #05 | John#1 Private Top/ScanToEmail | 11 | True |
| 11 | INDIVIDUAL | SCAN | ScanToEmail #06 | John#1 Private Top/ScanToEmail | 17 | True |
| 12 | INDIVIDUAL | SCAN | ScanToEmail #07 | John#1 Private Top/ScanToEmail | 0 | True |
| 13 | INDIVIDUAL | SCAN | ScanToEmail #08 | John#1 Private Top/ScanToEmail | 5 | True |
| 14 | INDIVIDUAL | SCAN | ScanToEmail #09 | John#1 Private Top/ScanToEmail | 7 | True |
| 15 | INDIVIDUAL | SCAN | ScanToEmail #10 | John#1 Private Top/ScanToEmail | 15 | True |

FIG. 19A

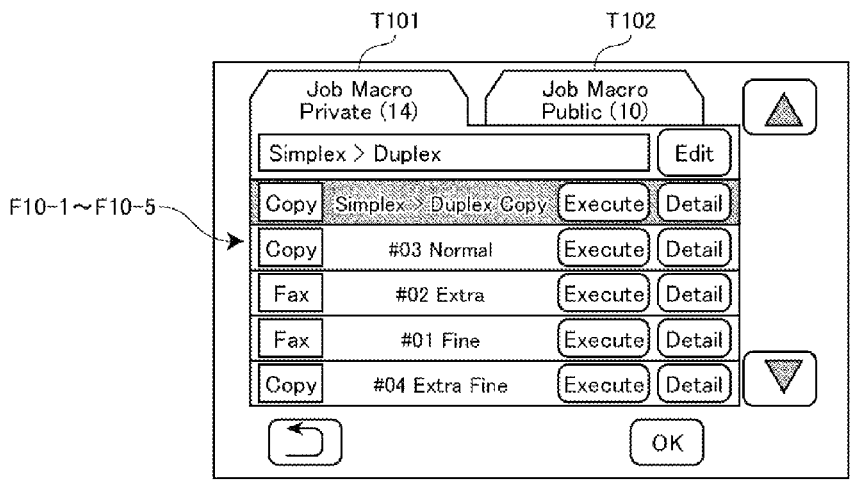

FIG. 19B

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top | 55 | True |
| 2 | INDIVIDUAL | COPY | #03 Normal | John#1 Private Top | 15 | True |
| 3 | INDIVIDUAL | FAX | #02 Extra | John#1 Private Top | 10 | True |
| 4 | INDIVIDUAL | FAX | #01 Fine | John#1 Private Top | 5 | True |
| 5 | INDIVIDUAL | COPY | #04 Extra Fine | John#1 Private Top | 1 | True |
| 6 | INDIVIDUAL | SCAN | ScanToEmail #01 | John#1 Private Top/ScanToEmail | 6 | True |
| 7 | INDIVIDUAL | SCAN | ScanToEmail #02 | John#1 Private Top/ScanToEmail | 20 | True |
| 8 | INDIVIDUAL | SCAN | ScanToEmail #03 | John#1 Private Top/ScanToEmail | 3 | True |
| 9 | INDIVIDUAL | SCAN | ScanToEmail #04 | John#1 Private Top/ScanToEmail | 10 | True |
| 10 | INDIVIDUAL | SCAN | ScanToEmail #05 | John#1 Private Top/ScanToEmail | 11 | True |
| 11 | INDIVIDUAL | SCAN | ScanToEmail #06 | John#1 Private Top/ScanToEmail | 17 | True |
| 12 | INDIVIDUAL | SCAN | ScanToEmail #07 | John#1 Private Top/ScanToEmail | 0 | True |
| 13 | INDIVIDUAL | SCAN | ScanToEmail #08 | John#1 Private Top/ScanToEmail | 5 | True |
| 14 | INDIVIDUAL | SCAN | ScanToEmail #09 | John#1 Private Top/ScanToEmail | 7 | True |
| 15 | INDIVIDUAL | SCAN | ScanToEmail #10 | John#1 Private Top/ScanToEmail | 15 | True |

FIG. 20A

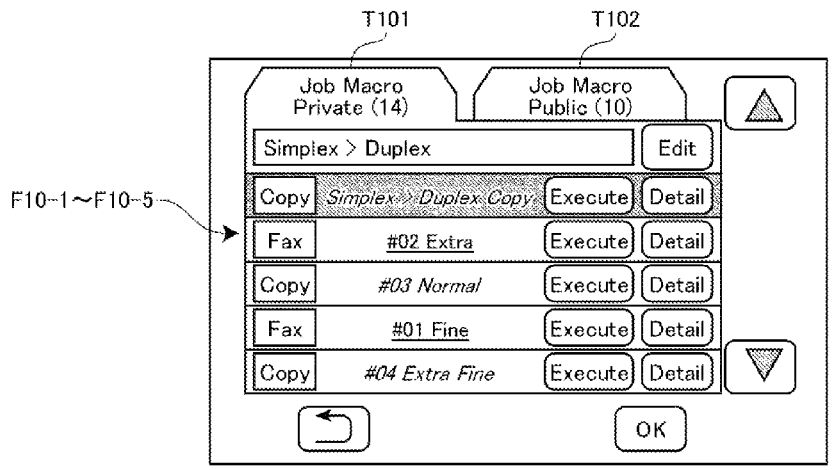

FIG. 20B

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top | 55 | True |
| 2 | INDIVIDUAL | FAX | #02 Extra | John#1 Private Top | 10 | True |
| 3 | INDIVIDUAL | COPY | #03 Normal | John#1 Private Top | 15 | True |
| 4 | INDIVIDUAL | FAX | #01 Fine | John#1 Private Top | 5 | True |
| 5 | INDIVIDUAL | COPY | #04 Extra Fine | John#1 Private Top | 1 | True |
| 6 | INDIVIDUAL | SCAN | ScanToEmail #01 | John#1 Private Top/ScanToEmail | 6 | True |
| 7 | INDIVIDUAL | SCAN | ScanToEmail #02 | John#1 Private Top/ScanToEmail | 20 | True |
| 8 | INDIVIDUAL | SCAN | ScanToEmail #03 | John#1 Private Top/ScanToEmail | 3 | True |
| 9 | INDIVIDUAL | SCAN | ScanToEmail #04 | John#1 Private Top/ScanToEmail | 10 | True |
| 10 | INDIVIDUAL | SCAN | ScanToEmail #05 | John#1 Private Top/ScanToEmail | 11 | True |
| 11 | INDIVIDUAL | SCAN | ScanToEmail #06 | John#1 Private Top/ScanToEmail | 17 | True |
| 12 | INDIVIDUAL | SCAN | ScanToEmail #07 | John#1 Private Top/ScanToEmail | 0 | True |
| 13 | INDIVIDUAL | SCAN | ScanToEmail #08 | John#1 Private Top/ScanToEmail | 5 | True |
| 14 | INDIVIDUAL | SCAN | ScanToEmail #09 | John#1 Private Top/ScanToEmail | 7 | True |

FIG. 24A

| No. | MACRO TYPE | FUNC-TION | NAME | STORING PATH | USE NUMBER | ARRANGED STATUS FLAG |
|---|---|---|---|---|---|---|
| 1 | INDIVIDUAL | COPY | Simplex > Duplex Copy | John#1 Private Top | 55 | False |
| 2 | INDIVIDUAL | FAX | #02 Extra | John#1 Private Top | 10 | False |
| 3 | INDIVIDUAL | COPY | #03 Normal | John#1 Private Top | 15 | False |
| 4 | INDIVIDUAL | FAX | #01 Fine | John#1 Private Top/ScanToEmail | 5 | False |
| 5 | INDIVIDUAL | SCAN | ScanToEmail #01 | John#1 Private Top/ScanToEmail | 6 | True |
| 6 | INDIVIDUAL | SCAN | ScanToEmail #02 | John#1 Private Top/ScanToEmail | 20 | True |
| 7 | INDIVIDUAL | SCAN | ScanToEmail #03 | John#1 Private Top/ScanToEmail | 3 | True |
| 8 | INDIVIDUAL | SCAN | ScanToEmail #04 | John#1 Private Top/ScanToEmail | 10 | True |
| 9 | INDIVIDUAL | SCAN | ScanToEmail #05 | John#1 Private Top/ScanToEmail | 11 | True |
| 10 | INDIVIDUAL | SCAN | ScanToEmail #06 | John#1 Private Top/ScanToEmail | 17 | True |
| 11 | INDIVIDUAL | SCAN | ScanToEmail #07 | John#1 Private Top/ScanToEmail | 1 | True |
| 12 | INDIVIDUAL | SCAN | ScanToEmail #08 | John#1 Private Top/ScanToEmail | 5 | True |
| 13 | INDIVIDUAL | SCAN | ScanToEmail #09 | John#1 Private Top/ScanToEmail | 7 | True |
| 14 | INDIVIDUAL | SCAN | ScanToEmail #10 | John#1 Private Top/ScanToEmail | 15 | True |

FIG. 24B

| No. | MACRO TYPE | FUNC-TION | NAME | STORING PATH | USE NUMBER | ARRANGED STATUS FLAG |
|---|---|---|---|---|---|---|
| 15 | SHARING | COPY | Simplex > Duplex Copy | Public Top | 55 | False |

INFORMATION PROCESSING APPARATUS AND IMAGE FORMING APPARATUS

CROSS REFERENCE TO RELATED APPLICATION

This application claims priority benefits under 35 USC, section 119 on the basis of Japanese Patent Application No. 2013-003931, the disclosure of which is incorporated herein by reference.

BACKGROUND OF THE INVENTION

1. Field of the Invention

This invention relates to an information processing apparatus and an image forming apparatus and, more particularly, to an apparatus such as e.g., an MFP (Multifunction Peripheral) in which file management is made on a control panel thereof.

2. Description of Related Art

A prior art as described in Japanese Patent Application Publication (A1), No. 2010-3109, has been known as a conventional art in which data storing files are arranged and managed in a computer to render users efficiently use the arranged files.

With an arranging method described in the above Publication, a file number of the files stored in a directory is counted up for each attribute, e.g., producer, producing date, and size; the user is informed of an incident file in a case that the counted file number exceeds a threshold value; then, the processing moves from the first directory to the second directory.

The arranging method according to the above Publication, however, basically performs no more than increasing just one file, though called as a file arrangement, and it is not always for some user to arrange the files in a way to be easily understandable.

SUMMARY OF THE INVENTION

It is therefore an object of the invention to provide an image forming apparatus as well as an image forming apparatus capable of arranging files in a highly useful way.

To solve the above problems, an information processing apparatus according to the invention includes a manipulating unit receiving an instruction based on a user manipulation and outputting an instruction signal, a setting unit for setting a rule for arranging a file or files based on the instruction signal from the manipulating unit, a detecting unit for detecting a file number, and a controlling unit for arranging the file or files based on the rule set with the setting unit in a case where the file number exceeds a threshold value.

In another aspect of the invention, an image forming apparatus according to the invention includes a manipulating unit receiving an instruction based on a user manipulation and outputting an instruction signal, a reading out unit for reading out, form a folder in a memory medium, a job macro file indicating an instruction content corresponding to an instruction based on a series of user manipulations, a processing unit for executing a series of processings according to the read-out job macro file, a setting unit for setting a rule for arranging a job macro file or files stored in the folder in the memory medium based on the instruction signal from the manipulating unit, a detecting unit for detecting a file number of the job macro file or files stored in the folder, and a controlling unit for arranging the file or files stored in the folder based on the rule set with the setting unit in a case where the file number exceeds a threshold value.

According to the invention, the information processing apparatus and the image forming apparatus can be provided with file arrangements done in a highly useful way.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 5 is a table showing a structural example of a table file according to the first embodiment;

FIG. 6 is a flowchart showing a setting processing for a job macro arrangement done at the MFP according to the first embodiment;

FIG. 11 is a table showing a modified structural example of the table file according to the first embodiment;

FIGS. 14A, 14B are first diagrams showing a table file and a control panel displayed at a touch panel portion in a case where the MFP according to the first embodiment does processing of the job macro arrangement;

FIGS. 15A, 15B are second diagrams showing the table file and the control panel displayed at a touch panel portion in a case where the MFP according to the first embodiment does processing of the job macro arrangement;

FIGS. 16A, 16B are third diagrams showing the table file and the control panel displayed at a touch panel portion in a case where the MFP according to the first embodiment does processing of the job macro arrangement;

FIGS. 17A, 17B are fourth diagrams showing the table file and the control panel displayed at a touch panel portion in a case where the MFP according to the first embodiment does processing of the job macro arrangement;

FIGS. 18A, 18B are fifth diagrams showing the table file and the control panel displayed at a touch panel portion in a case where the MFP according to the first embodiment does processing of the job macro arrangement;

FIGS. 19A, 19B are sixth diagrams showing the table file and the control panel displayed at a touch panel portion in a case where the MFP according to the first embodiment does processing of the job macro arrangement;

FIGS. 20A, 20B are seventh diagrams showing the table file and the control panel displayed at a touch panel portion in a case where the MFP according to the first embodiment does processing of the job macro arrangement;

FIGS. 24A, 24B are diagrams showing table files in association with the job macro copying processing done at the MFP according to the second embodiment;

DETAILED DESCRIPTION OF EMBODIMENTS

First Embodiment

Figure 1:
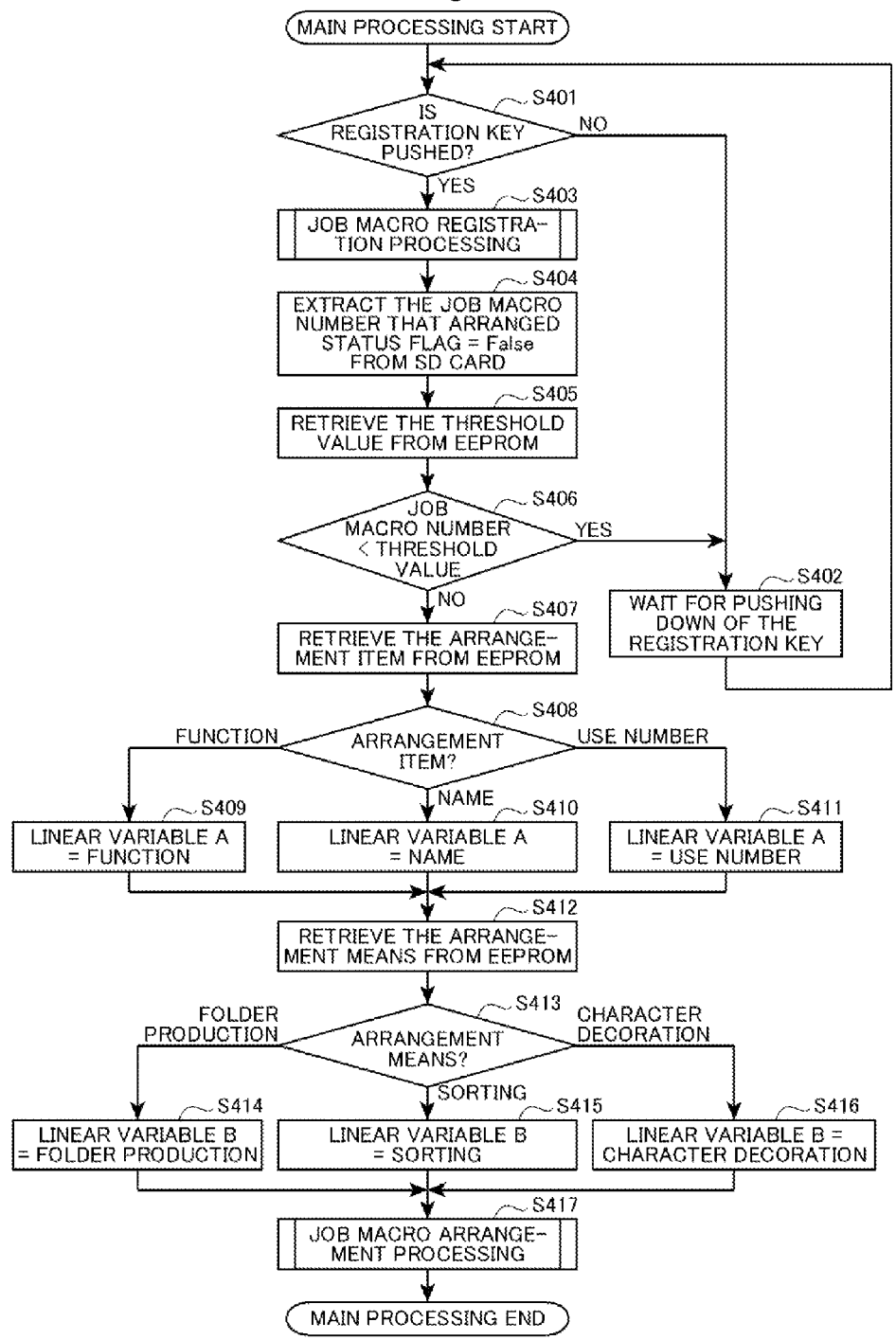
FIG. 1 is a first flowchart of a job macro arrangement processing done at an MFP according to a first embodiment of the invention.

Hereinafter, referring to the drawings, an information processing apparatus and an image forming apparatus, according to the first embodiment, are described in detail. In this embodiment, the image forming apparatus having the information processing apparatus mounted according to the invention is exemplified as an example of an application to an MFP.

Figure 2:
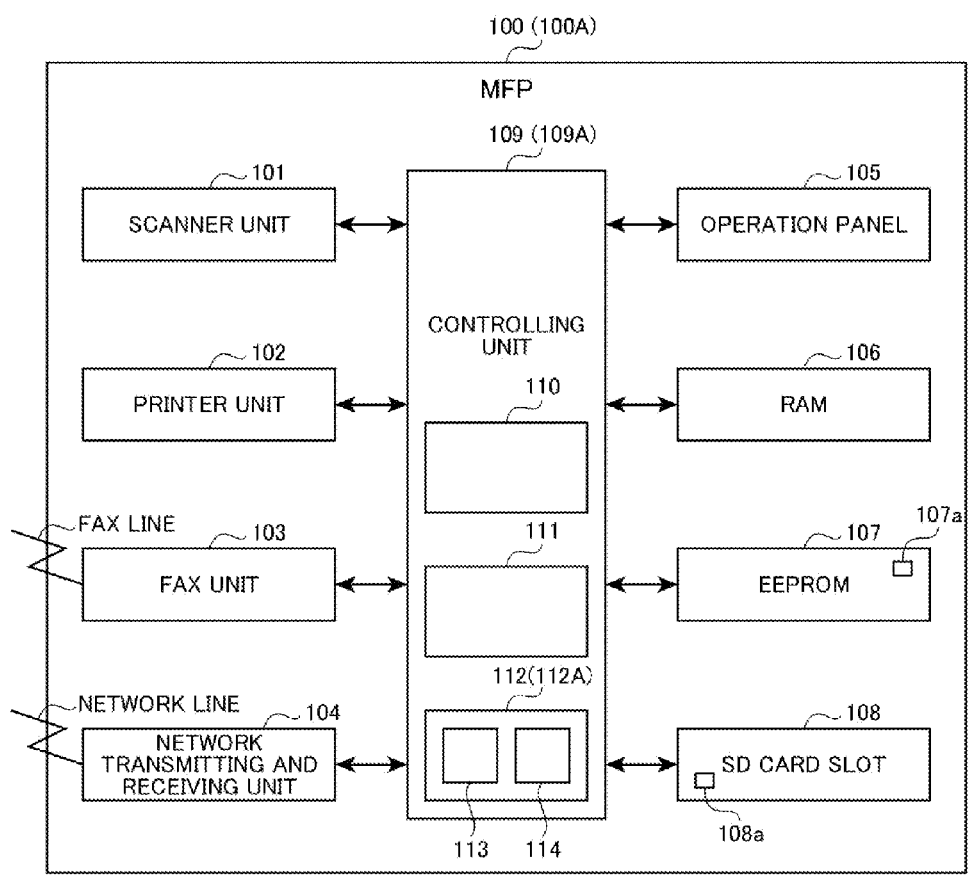
FIG. 2 is a block diagram showing a functional structure of the MFP according to the first embodiment.

FIG. 2 is a diagram showing a functional structure of the MFP 100 according to this embodiment. The MFP 100 according to the embodiment has a scanner unit 101, a printer unit 102, a fax unit 103, a network transmitting and receiving unit 104, an operation panel 105, a RAM 106, an EEPROM 107, an SD card slot 108 for SD memory card or SD card 108a, and a controlling unit 109.

The controlling unit 109 controls operation of each structural element, and includes an image data processing unit 110, a job macro processing unit 111, and a file arrangement controlling unit 112. The controlling unit 109 can be formed by executing a program with a computer having, e.g., a processor, or at least a program realizing a function of the file arrangement controlling unit 112. The file arrangement controlling unit 112 further includes a detecting unit 113 for detecting a file number, and a setting unit 114 for setting a job macro arrangement.

The information processing apparatus according to this embodiment is structured of a manipulation unit such as, e.g., the operation panel 105, and the file arrangement controlling unit 112 including the detecting unit 113 and the setting unit 114. In other words, the information processing apparatus can be realized by installing a certain data processing program to a processor thereof.

The image data processing unit 110 is for executing a variety of image processings corresponding to functions of the MFP 100. The image data processing unit 110 processes data fed from, e.g., the scanner unit 101, the fax unit 103, and the network transmitting and receiving unit 104, in accordance with user's manipulation and supplies the data to other structural elements. The image data processing unit 110 processes the data supplied according to the user's manipulation and performs output processing of contents according to the user's manipulation.

The job macro processing unit 111 performs processings relating to job macro described below. In this embodiment, the term "job macro" indicates a series of operations such as, e.g., operations of hardware keys and software keys, made into a macroinstruction or a script, when processing based on the respective functions of the MFP 100. The job macro processing unit 111 processes a series of key operations done by the users as a job macro (or job macro file). When the user uses the copy function, the user needs to operate items of the setting different from the default setting such as, e.g., scaling rate, copy sheet number, and printing density of the MFP 100, generally in a way of manual operation or key operation. If the job macro or macros are registered in advance in the MFP 100, a function can be executed simply by selecting the job macro without complicated operations.

The job macro processing unit 111 does registration, reading-out, editing, deletion, etc., in accordance with the user's operation. In this embodiment, when receiving a registration of a job macro (job macro file), the job macro processing unit 111 stores data of the job macro, or namely, data indicating a series of operations, as a job macro file, in the SD card 108a. The job macro processing unit 111 reads the job macro file stored in the SD card 108a in accordance with the user's operation, thereby rendering the image data processing unit 110 execute the processing based on the job macro file.

The file arrangement controlling unit 112 has a function to arrange the files stored in the SD card 108a. Details of the file arrangement controlling unit 112 will be described below.

The RAM 106 is a memory region (primary memory region) for storing temporarily the data during execution of processings for the respective functions. The EEPROM 107 is a non-volatile memory storing such as, e.g., parameters about setting information of the apparatus and programs executed at the controlling unit 109. The EEPROM 107 memorizes job macro setting information 107a. The job macro setting information 107a is integrated data of information of various settings to be used when the job macro processing unit 111 and the file arrangement controlling unit 112 perform the processing of the job macro.

The SD card slot 108 is a device for containing the SD card 108a. The controlling unit 109 is accessible to the SD card 108a contained in the SD card slot 108. In the MFP of this embodiment, the SD card 108a is used for detachably attaching non-volatile data memorizing medium, but other data memorizing media such as, e.g., USB memory or Memory Stick (trademark) may also be useful. The SD card 108a stores the job macro files and the like to be used for arrangement done by the controlling unit 109 and, more specifically, the file arrangement controlling unit 112. The structure of the file system in the SD card 108a will be described below.

The operation panel 105 serves as the manipulation unit and functions as a user interface at the MFP 100. Specifically, the operation panel 105 in this embodiment does information output to the users and input entry from the users using the touch panel display and hardware keys. The detail of the structure of the operation panel 105 will be described below.

The scanner unit 101 reads original documents with an original document flat bet or an automatic document feeder, produces image data from the read original documents, and feeds the image data to the controlling unit 109 (or namely the image data processing unit 110).

The printer unit 102 receives supply of the image data from the scanner unit 101 and the network transmitting and receiving unit 104 via the controlling unit 109 or namely the image data processing unit 110, and processes printing or image forming on printing sheets or media.

For example, the printer unit 102 converts the image data supplied from the controlling unit 109 or namely the image data processing unit 110 into the printing data, and performs processing of printing, as processing of "copy function." The printing unit 102 also prints upon reception of the printing job data received at the network transmitting and receiving unit 104 via the controlling unit 109 or namely the image data processing unit 110. More specifically, the printer unit 102 produces the printing image data based on the data of the supplied printing job, and performs printing on printing sheets, as processing of "printing function."

The fax unit 103 is connected to a telephone line or facsimile line and serves for "fax function" in the MFP 100. The fax unit 103, for example, receives supply of the image data produced at the scanner unit 101 via the controlling unit 109 or namely the image data processing unit 110, converts the image data into facsimile data, signals for facsimile transmission, which are facsimile-transmittable, and transmits to the external or telephone communication network through the telephone line, as processing of "fax function."

The network transmitting and receiving unit 104 is in charge of a network interface function connecting the MFP 100 to a network such as, e.g., LAN. Where printing job data are supplied through communications from a host apparatus such as, e.g., PC (personal computer), the network transmitting and receiving unit 104 supplies the printing job data to the printer unit 102 via the controlling unit 109 or namely the image data processing unit 110. When the image data produced at the scanner unit 101 are supplied via the controlling unit 109 or namely the image data processing unit 110, the network transmitting and receiving unit 104 performs sending an E-mail attaching the image data to an address corresponding to user's operation, as processing of "scan to email function." Hereinafter, the term "scan to email function" is simply referred to as "scan function."

Figure 3:
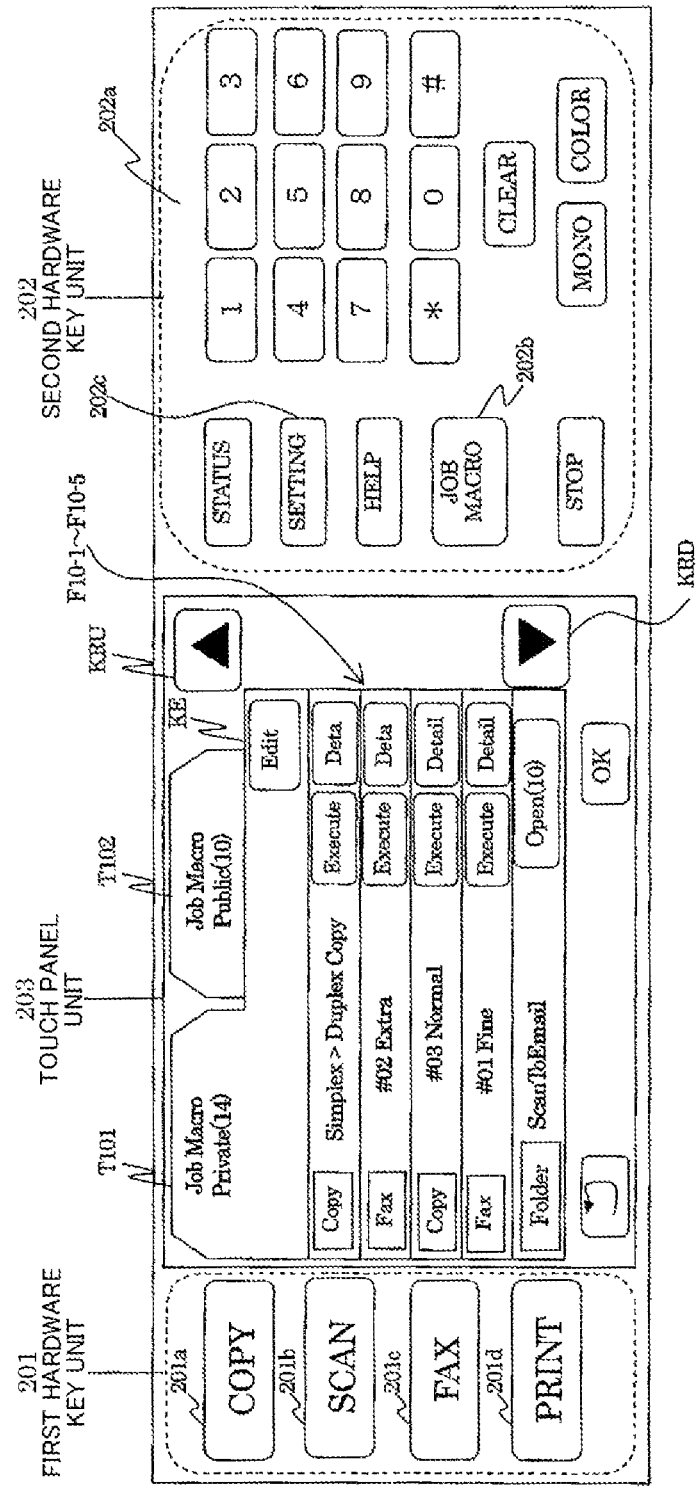
FIG. 3 is a diagram showing a structural example of an operation panel mounted on the MFP according to the first embodiment.

Next, a structural example of the operation panel 105 is described in reference to FIG. 3. FIG. 3 is a plan view of the operation panel 105. The operation panel 105 of this embodiment is, when roughly classified, structured from a first hardware key unit 201, a second hardware key 202, and a touch panel unit 203.

The touch panel unit 203 is a device showing, at an LCD display, an operation screen corresponding to the control of the controlling unit 109, and being capable of receiving operations from users such as, e.g., pushing down of software keys on the operation screen. The touch panel unit 203 supplies operation signals such as, e.g., information of regions touched by the user, based on manipulations of the user to the controlling unit 109.

The first hardware key unit 201 and the second hardware key unit 202 are structured of plural hardware keys, respectively. The controlling unit 109 receives supply of the operation signals according to pushing down of the respective keys.

The first hardware key unit 201 is disposed with keys (function keys) corresponding to the respective functions performed at the MFP 100. In the MFP 100, if any of function keys structuring the first hardware key unit 201 is pushed down, the operation screen of the touch panel unit 203 is transited to a screen receiving operations for executing the function or functions (hereinafter, referred to as "operation executing screen").

The first hardware key unit 201 is disposed with a copy function key or button 201a, a scan function key or button 201b, a fax function key or button 201c, and a print function key or button 201d, which are corresponding to the copy function, the scan function, the fax function, and the print function, respectively.

The second hardware key unit 202 is disposed with, at least, a numeric key portion 202a, a job macro key 202b allowing shifting to a screen for main processing according to the job macro (hereinafter, referred to as "job macro main screen"), and a setting key 202c for shifting to a setting menu for entering various setting.

Referring to FIG. 3, the job macro main screen serving as an operation screen for job macros, which is displayed at the touch panel unit 203 upon pushing down of the job macro key 202b, is described.

As shown in FIG. 3, the job macro main screen in this embodiment is, when roughly classified, structured of a tab for individual T101 for managing job macros for individuals (job macro private) and a tab for sharing T102 for managing job macros shared by plural users (job macro public), which are displayable in a switching way.

Five display fields F10-1 to F10-5 are disposed on respective tabs on the job macro main screen. The respective display fields F10 are objects capable of displaying information and receiving operations relating to one job macro or one subfolder, i.e., a subfolder storing a job macro file.

That is, because the five display fields F10 are disposed on the job macro main screen in this embodiment, five job macros or subfolders can be displayed simultaneously.

In this embodiment, each field F10 shows, in the order from the left side, function name or "Folder" in a case of subfolder, job macro name or subfolder name in a case of subfolder, and "Execute" key and "Detail" key or "Open" key in a case of subfolder. An additional number given to the Open key, i.e., the number (10) at the key of "Open (10)" in FIG. 3, indicates the number of job macro files in the subfolder.

When the "Execute" key is pushed down, the controlling unit 109 or namely the job macro processing unit 111 reads the job macro file corresponding to the incident field F10 therein and processes executing the file. When the "Detail" key is pushed down, the controlling unit 109 or namely the job macro processing unit 111 displays details of contents of job macros (job macro files) corresponding to the incident field F10 and a screen for edition. When the "Open" key is pushed down, the controlling unit 109 or namely the job macro processing unit 111 shifts the operation to displaying the job macro (job macro file) in the subfolder.

The job macro main screen is disposed with an "Edit" key KE, a roll up key KRU, and a roll down key KRD.

When the "Edit" key KE is pushed down, the controlling unit 109 or namely the job macro processing unit 111 shifts the operation to a screen for producing new job macros.

When the roll down key KRD or the roll up key KRU is pushed down, the controlling unit 109 or namely the job macro processing unit 111 rolls down or up the display of the job macros shown in the display fields F10-1 to F10-5.

Figure 4:
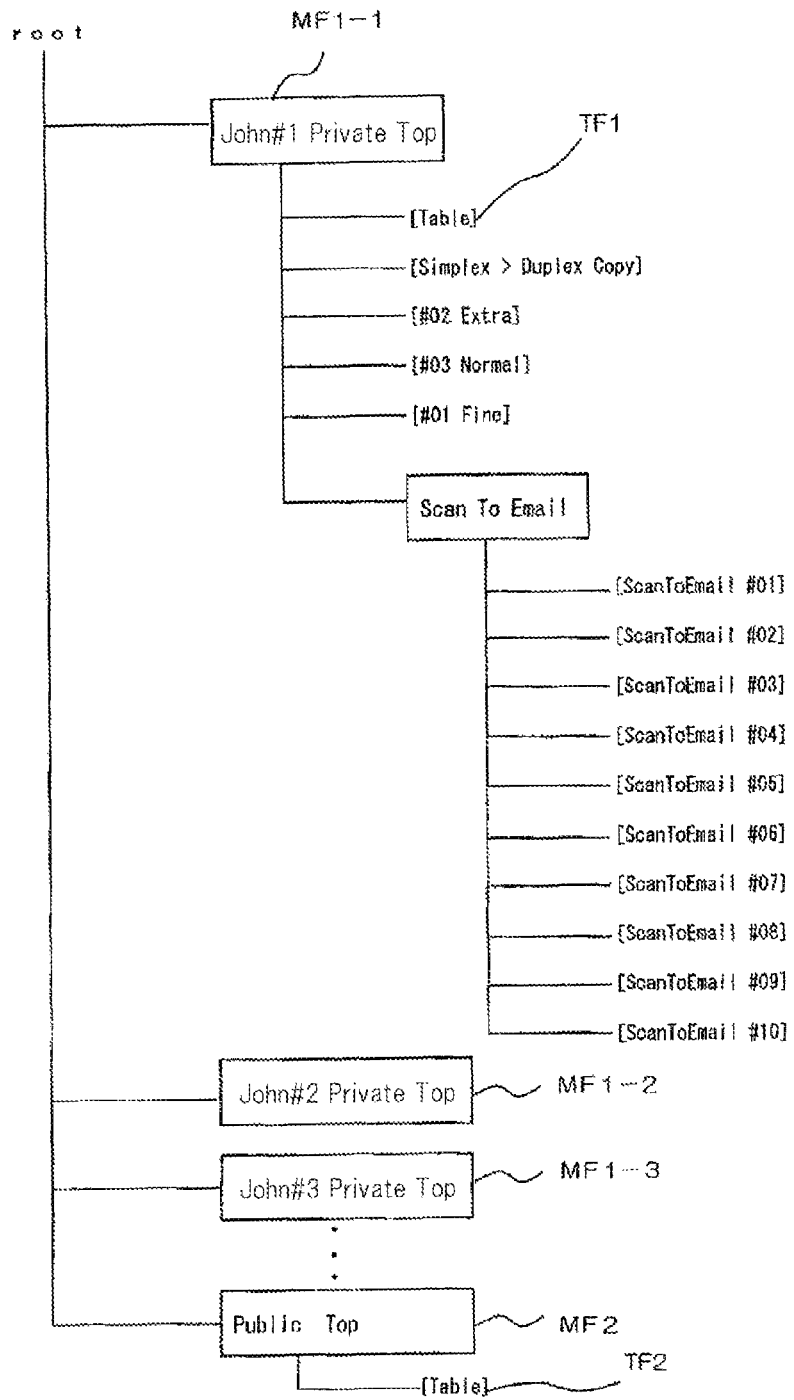
FIG. 4 is a diagram showing a structural example of a directory of job macro files stored in an SD (trademark) card according to the first embodiment.

FIG. 4 is a diagram showing a structural example of a directory of job macro files stored in the SD card 108a. It is to be noted that in this embodiment the FAT (File Allocation Tables) format file system is used in the SD card 108a.

In FIG. 4, provided directly beneath are a main folder (hereinafter, referred to as "main folder MF1 for individual") used for folders for individuals (main folders corresponding to tab for individual T101), and a main folder (hereinafter, referred to as "main folder MF2 for sharing") used for main folders for sharing (main folders corresponding to tab for sharing T102). In FIG. 4, an example providing three main folders MF1-1 through MF1-3 for individual (main folders for individual for three users) and one main folder MF2 for sharing is exemplified beneath the root.

Because the basic structure is substantially the same between the respective main folder MF1 for individual and the main folder MF2 for sharing, FIG. 4 in detail shows only one main folder MF1-1 for individual.

In this embodiment, the main folder MF1 for individual is used for a purpose of storing the job macros mainly used by the respective users individually, whereas the main folder MF2 for sharing is used for a purpose of storing job macros mainly used by plural users.

In FIG. 4, the directory names of the main folders MF1-1 through MF1-3 for individual are shown as "John #1 Private Top," "John #2 Private Top," and "John #3 Private Top." The strings of the leading part of the directory names of the main folders MF1-1 through MF1-3 for individual (John #1, John #2, and John #3) indicate user IDs or user names of the users. In FIG. 4, the directory name of the main folder MF2 for sharing is shown as "Public Top."

The MFP 100 receives a login of the user, such as, e.g., logins with user ID or entry of password, or insertion of a medium such as a card, before reception of image processing request from the user, thereby allowing processing only on the main folders MF1 for individual of the users authorized successfully and the main folder MF2 for sharing. In this specification, no specific structure of authentifying means such as login operation (for example, media used for login, entry contents, authentifying method, etc.) in the MFP 100 is shown, but various systems and structures can be used. In the MFP 100, after the user's login, the tab T101 for individual of the touch panel unit 203 displays the contents of the main folder MF1 for individual relating to the login user. In this embodiment, an example in which the login is made with the user ID "John #1" to perform the processing of the main folder MF1-1 is described.

As shown in FIG. 4, provided directly beneath the main folder MF1-1 for individual are four job macro files "Simplex>Duplex Copy," "#02 Extra," "#03 Normal," and "#01 Fine," a table file "Table" as a job macro management table (hereinafter referred to as "table file TF1"), and a subfolder "ScanToEmail." The subfolder "ScanToEmail" stores ten job macro files "ScanToEmail #01" through "ScanToEmail #10."

A job macro file structure beneath the main folder MF1-1 for individual, including a structure of subfolders, is managed in the table file TF1. In the MFP 100, the table file TF1 has a structure shown in FIG. 5.

As shown in FIG. 5, the table file TF1 stores, at each job macro or each macro file, information of items of "No.," "macro type," "function," "name," "storing path," "use number," and "arranged status flag."

The item "No." is an identifier or key of the respective job macros in the table file TF1, having a function to manage the priority sequence when preferentially displayed on the job macro main screen. In this embodiment, where the value of the item "No." is smaller, the priority rank of the job macro becomes higher. That is, the initial screen is displayed at the display field F10 with the sequence of the number of the item "No." (ascending order) on the job macro main screen. The job macro main screen displays with the sequence of "No." even where the display is scrolled lately.

The item "macro type" indicates either the job macro for individual or for sharing. The item "function" shows a function of the incident job macro, and is set with a function (any one of copy, fax, and scan) corresponding to the job macro. The item "function" corresponds to the indication of "function" in the display field F10 of the job macro main screen. The item "name" shows the name of the job macro. The file name of the respective job macro files is set with the contents of the item "name." The item "name" corresponds to the display of "name" in the display field F10 of the job macro main screen. The item "storing path" is set with a path name (directory name) in which the job macro file corresponding to the incident job macro is stored. The item "use number" indicates the number that the incident job macro is executed. The item "arranged status flag" is a flag indicating as to whether the job macro arrangement processing for the incident job macro is done or not.

It is to be noted the table file TF1 shown in FIG. 5 has contents of the table file TF1 of the main folder MF1-1 for individual shown in FIG. 4. The job macro files corresponding to job macros whose "No." are 1 through 4 in the table file TF1 are "Simplex>Duplex Copy," "#02 Extra," "#03 Normal," and "#01 Fine," respectively, located immediately beneath "Private Top." Furthermore, the job macro files corresponding to job macros whose "No." are 5 through 14 in the table file TF1 are job macro files "ScanToEmail #01" through "ScanToEmail #10" located in the subfolder "ScanToEmail."

Thus, the contents of the table file and the storing structure (directory structure) of the job macro file are synchronized with each other within the respective main folders. The number of the main folders MF1 for individual provided beneath the root is not limited.

The controlling unit 109 or namely the job macro processing unit 111, as shown in FIG. 4 and FIG. 5, displays the display fields F10-1 to F10-5 shown as the initial state of the job macro main screen in the ascending order of the values of "No." That is, the controlling unit 109 or namely the job macro processing unit 111 displays the job macros (or subfolders) whose item "No." has values of 1 to 5, at the display fields F10-1 to F10-5 as the initial state of the job macro main screen. The controlling unit 109 or namely the job macro processing unit 111 scrolls the job macros or subfolders displayed at the display fields F10-1 to F10-5 according to pushing down of the roll up key KRU or the roll down key KRD. It is to be noted that the controlling unit 109 or namely the job macro processing unit 111, as shown in FIG. 4 and FIG. 5, displays the job macro provided beneath the subfolder, at one of the display fields F10 as the subfolder, shown as the initial state of the job macro main screen. When the "Open" key of the display field F10 in association with the subfolder is pushed down, the controlling unit 109 or namely the job macro processing unit 111 displays the job macros provided beneath the incident subfolder at the display fields F10-1 to F10-5 in a way of the ascending order of the values of the item "No."

As described above, the scanner unit 101, the printer unit 102, the fax unit 103, and the image data processing unit 110 functions as an image information processing means in the MFP 100. The SD card 108a functions as a file memorizing means in the MFP 100. The job macro processing unit 111 functions as a file managing means in the MFP 100. The EEPROM 107 (job macro setting information 107a) functions as an information holding means in the MFP 100. The file arrangement controlling unit 112, in the MFP 100, includes the detecting unit 113 functioning as a file number detecting means, and the setting unit 114 functioning as a job macro arrangement setting means.

Figure 7A:
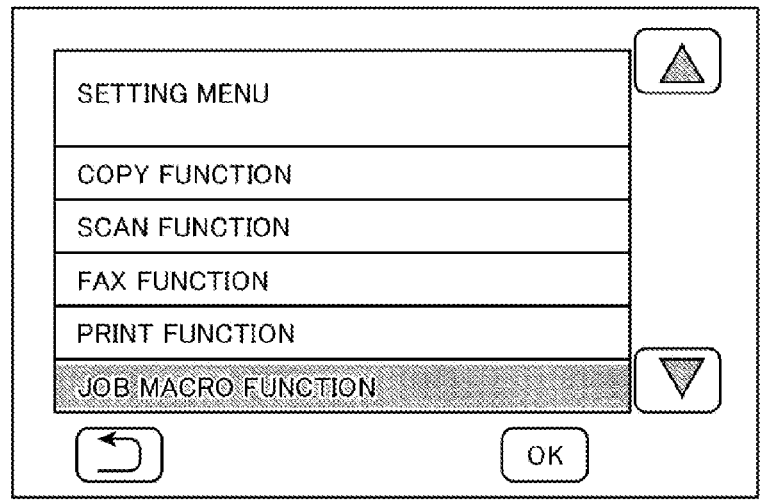
FIGS. 7A to 7C are first diagrams showing a transition of a control panel displayed at a touch panel portion in a case where the MFP according to the first embodiment does processing of setting the job macro arrangement.
Figure 7B:
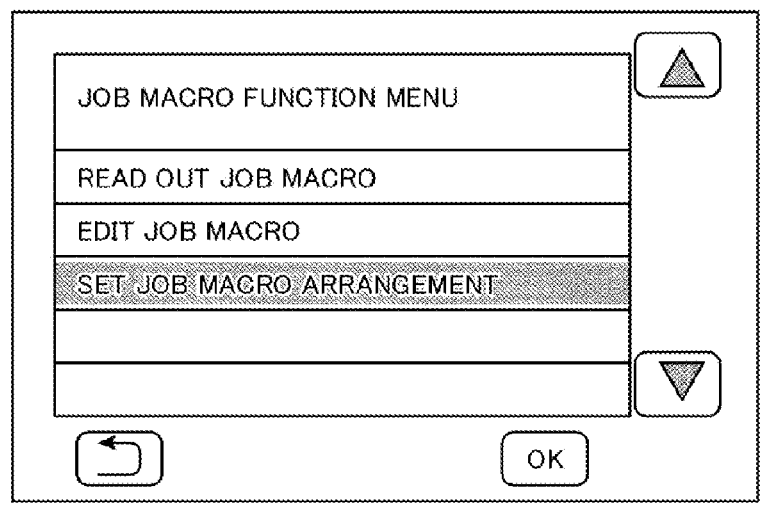

In operation of job macro arrangement settings, a processing of settings for job macro arrangement processing done with the controlling unit 109 (or file arrangement controlling unit 112) is described with reference to a flowchart in FIG. 6. FIG. 7 and FIG. 8 are diagrams showing transitions of the operation screen displayed at the touch panel unit 203 in a case where the controlling unit 109 performs processing according to the flowchart in FIG. 6.

First, in accordance with user's operation, the controlling unit 109 or namely the file arrangement controlling unit 112 renders the touch panel unit 203 show the operation screen for entry of the job macro arrangement settings (operation screen in FIG. 7(*c*)) (S101).

Although no trigger is set for the controlling unit 109 or namely the file arrangement controlling unit 112 to commence the job macro arrangement setting, a calling of the job macro arrangement setting may be done from the operation screen of a setting menu (operation screen shown in FIGS. 7A, 7B) displayed upon pushing of the setting key 202*c* in this embodiment. More specifically, when "job macro function" is selected on the operation screen shown in FIG. 7A, the controlling unit 109 displays an operation screen of the job macro function menu (operation screen shown in FIG. 7B) that can chose respective functions relating to job macros. If "job macro arrangement setting" is chosen on the operation screen of the job macro function menu, the controlling unit 109 or namely the file arrangement controlling unit 112 displays the operation screen for entry of the job macro arrangement setting (operation screen shown in FIG. 7C) on the touch panel unit 203.

Figure 7C:
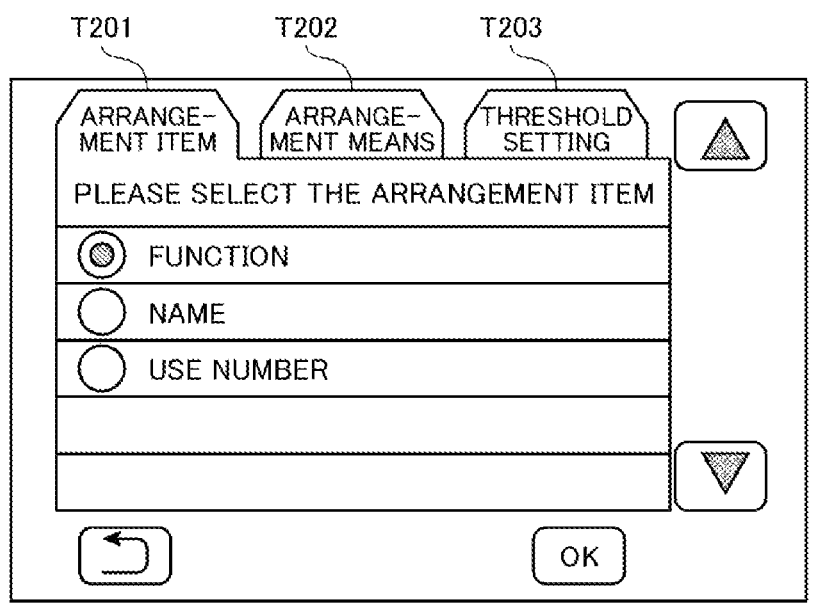
Figure 8A:
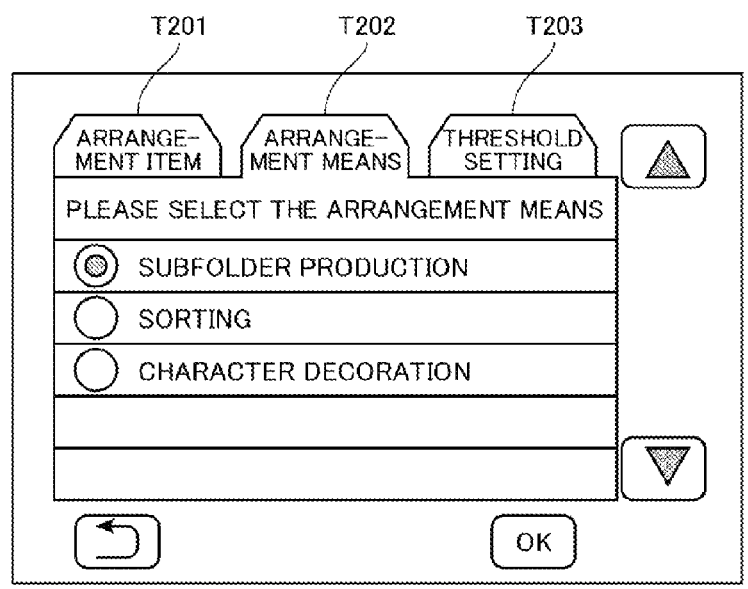
FIGS. 8A, 8B are second diagrams showing the transition of the control panel displayed at a touch panel portion in a case where the MFP according to the first embodiment does processing of setting the job macro arrangement.
Figure 8B:
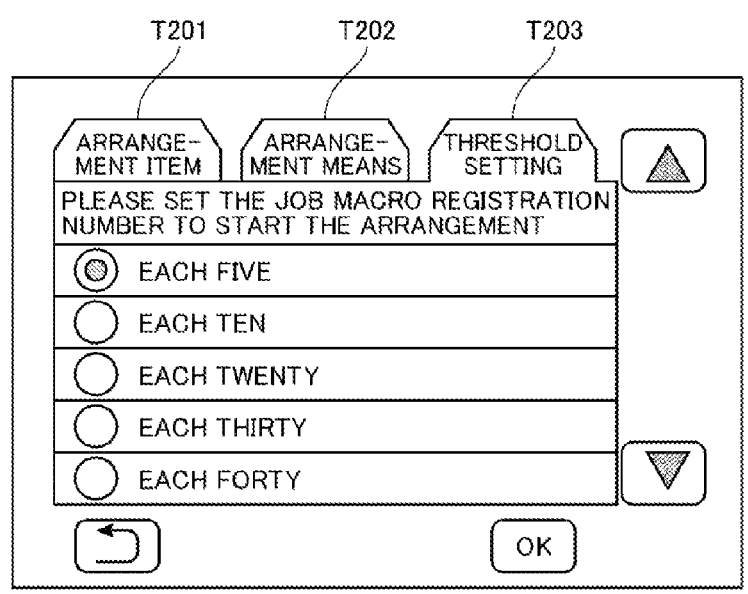

A tab T201 for designating "arrangement items," a tab T202 for selecting "arranging means," and a tab T203 for selecting a threshold value relating to the arrangement, are disposed on the operation screen of the job macro arrangement setting. FIG. 7C shows a state that the tab T201 for designating "arrangement items" is placed on a front side. FIG. 8A shows a state that the tab T202 for selecting "arrangement items" is placed on a front side. FIG. 8B shows a state that the tab T203 for selecting the threshold value relating to the arrangement is placed on a front side.

In this embodiment, the file arrangement controlling unit 112 does arrangement processing in which any one of "function" (the item of "function" of the table file TF1), "name" (the item of "name" of the table file TF1), and "use number" (the item of "use number" of the table file TF1) is set as the arrangement item (key). The tab T201 shown in FIG. 7C is an operation screen capable of selecting any one of "function," "name," and "use number" as the arrangement item, or a parameter used for the file arrangement.

The file arrangement controlling unit 112 in this embodiment, corresponds to "subfolder production" for producing a subfolder with the set arrangement item and storing the job macro files immediately beneath the root, "sorting" for sorting the job macro files immediately beneath the root according to the set arrangement item (or sorting the item "No." of the table file), and "character decoration" making the indication of the display fields F10 differently decorated characters at each value (contents) of the set arrangement item. The tab T202 shown in FIG. 8A has an operation screen capable of selecting any one of "subfolder production," "sorting," and "character decoration" as the arrangement means or an arranging method of the job macro arrangement processing.

In this embodiment, the file arrangement controlling unit 112 as shown in FIG. 8B further can take entries of settings of the threshold value (reference) for making judgment as to whether the job macro arrangement processing is done with the set arrangement items and arrangement means. For example, with this embodiment, it is described that the controlling unit 109 or namely the file arrangement controlling unit 112 judges as to execute the job macro arrangement processing where the job macro file number immediately beneath the root exceeds the threshold value. The tab T203 shown in FIG. 8B has an operation screen capable of selecting any one of "each five," "each ten," "each twenty," "each thirty," and "each forty," as a threshold value.

In this embodiment, the controlling unit 109 or namely the file arrangement controlling unit 112 is structured so that, when the item "name" is selected for "job macro arrangement item," the "job macro arrangement means" can choose only "sorting" and cannot choose other arranging means (for example. by making gray out or omitting indications).

Then, with the operation panels shown in FIG. 7C, FIG. 8A, and FIG. 8B, the user selects the arrangement item, the arrangement means, and the threshold value of the job macro file, and pushes the OK key (S102, S103). When the OK key is pushed, the controlling unit 109 or namely the file arrangement controlling unit 112 writes the selected arrangement item, the selected arrangement means, and the selected threshold value of the job macro file in the EEPROM 107 (job macro setting information 107*a*) (S104).

Figure 9:
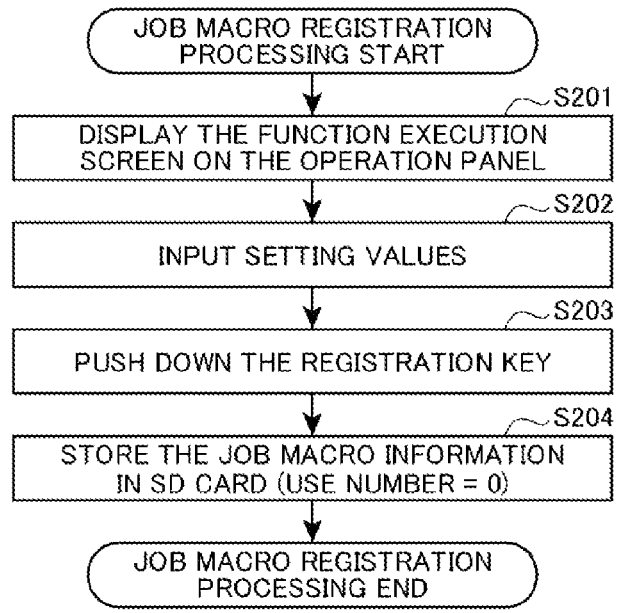
FIG. 9 is a flowchart showing a processing for registering a job macro arrangement done at the MFP according to the first embodiment.
Figure 10:
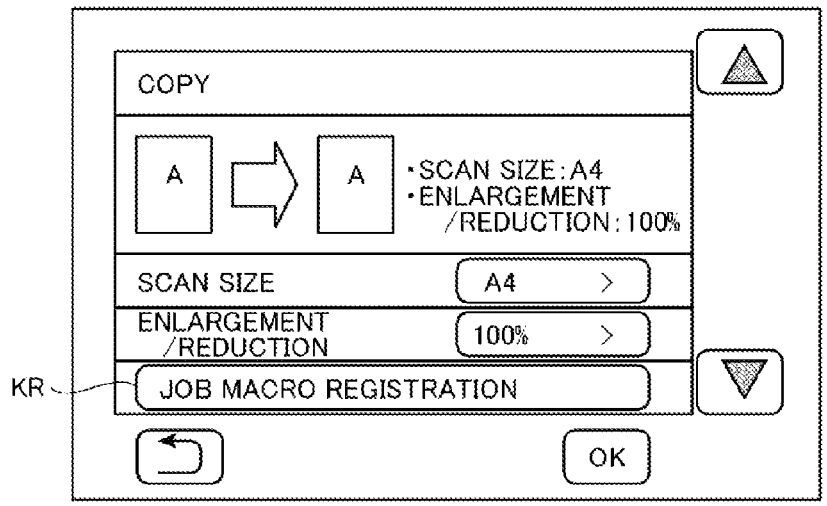
FIG. 10 is a diagram showing an example of a function execution screen displayed at the touch panel portion of the MFP according to the first embodiment.

Next, job macro registration processing is described with reference to FIG. 9 and FIG. 10. FIG. 9 is a flowchart showing the job macro registration processing for newly registering the job macro at the controlling unit 109 according to the user's manipulation. FIG. 10 is a diagram showing an example a copy function execution screen or an operation panel at a time of the entry of processing execution for the copy function.

First, the user pushes the copy function button 201*a*. When the copy function button 201*a*, the controlling unit 109 or namely the image data processing unit 110 renders the touch panel unit 203 display the execution screen of the copy function shown in FIG. 10 (S201).

Then, the user inputs respective parameter values such as, e.g., scaling rate, and scanning size, as user's selection, in the execution screen for copy function (S202).

When the user pushes down the key for executing the job macro registration on the execution screen of the copy function as shown in FIG. 10 (or the key indicated as "job macro registration" in FIG. 10) (S203), the controlling unit 109 or namely the job macro processing unit 111 produces data including the contents set at the execution screen of the copy function (or respective parameter values) or namely data indicating contents of the job macro, thereby executing processing for registering the data as a job macro file in the SD card 108 including a renewal processing of the table file TF1.

To simplify the description herein, it is described that a new job macro or job macro file is registered immediately beneath the main folder MF1-1 for individual, but it is a matter of course that the system may have a structure the user can choose any one of the main folder from the plural main folders. The new job macro may be registered in a subfolder in the main folder according to the manipulation of the user.

With this embodiment, the job macro, or job macro file, to be newly registered is inserted with the last "No." immediately beneath the main folder on the table file. Each value of "No." of the job macros in the subfolder is increased by one at that time. In this embodiment, the "use number" and the "arranged status flag" in association with the newly registered job macros or job macro files are initialized to "0" and "False," respectively. Further, in this embodiment, the name, or the file name, of the job macro, or the job macro file, to be newly registered may be the content according to the user's manipulation or may be given automatically after the name based on the content of the job macro.

Hereinafter, an example that a job macro file is newly registered in the main folder MF1-1 for individual is described. It is assumed herein that at the beginning the contents of the table file TF1 of the main folder MF1-1 for individual are what are shown in FIG. 5. According to the processing of the flowchart shown in FIG. 9, as described above, a job macro having a function of "copy" and a name of "#04 Extra Fine" is newly registered in the main folder MF1-1 for individual. Consequently, the contents of the table file TF1 of the main folder MF1-1 for individual are what is shown in FIG. 11. The new job macro is registered at a position in which the "No." is "five" or namely at the last position of the job macros located immediately beneath the main folder in the table file TF1 shown in FIG. 11. In the table file TF1 shown in FIG. 11, the "Nos." of the job macros between "No. 5" and "No. 14" are shifted down by one to be from "No. 6" to "No. 15."

Figure 12:
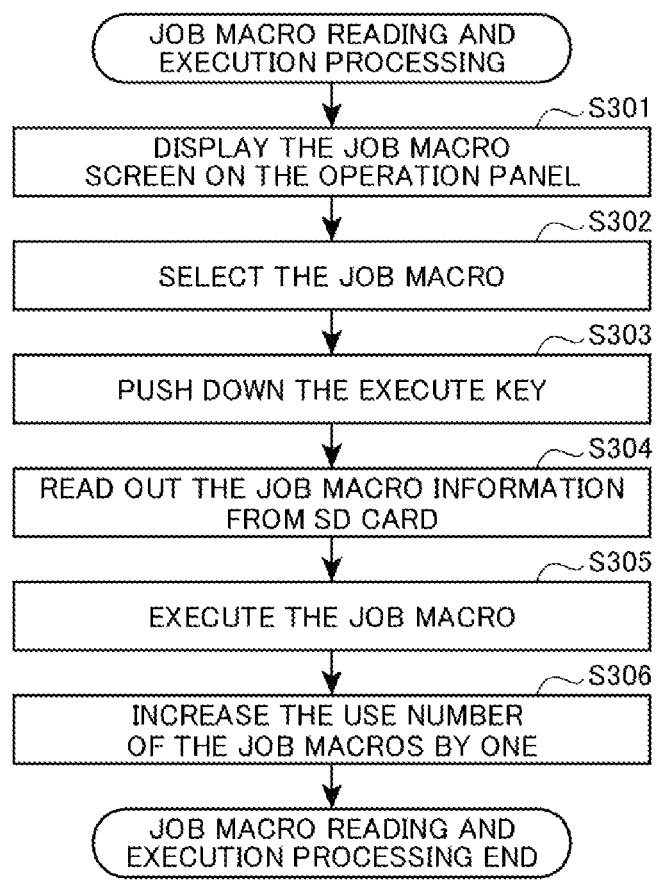
FIG. 12 is a flowchart showing operation in a case where a job macro is executed at the MFP according to the first embodiment.

Referring to a flowchart shown in FIG. 12, a processing for rendering the MFP 100 read the job macro or the job macro file and execute the job macro according to the user's operation (hereinafter, referred to as "job macro execution processing") is described below.

The user pushes down the job macro key 202b, and the controlling unit 109 displays the job macro main screen at the touch panel unit 203 (S301).

Any of the display fields of the job macros is selected or pushed down on the job macro main screen (S302), and then, the "Execute" key of the display field F10 is pushed down (S303). It is assumed herein that the job macro of the main folder MF1-1 for individual is selected.

When the "Execute" key is pushed down, the controlling unit 109 or namely the job macro processing unit 111 looks up the table file TF1 in the SD card 108a, thereby retrieving storing path and the name or the file name of the job macro file relating to the incident job macro, and reading out those data upon accessing to the job macro file (S304).

The controlling unit 109 or namely the job macro processing unit 111 processes to render the image data processing unit 110 execute the processing of the function according to the contents of the read job macro file (S305).

The controlling unit 109 or namely the job macro processing unit 111 performs a processing to make the use number on the table file TF1 of the executed job macro increase by one (S306), thereby ending the processing. For example, for the job macro having the "No." as "1" in the main folder MF1-1 for individual, the use number is increased from "55" (see, FIG. 5) to "56" where the job macro is executed according to the above-mentioned flowchart, because the use number in FIG. 5 is "55."

Figure 13:
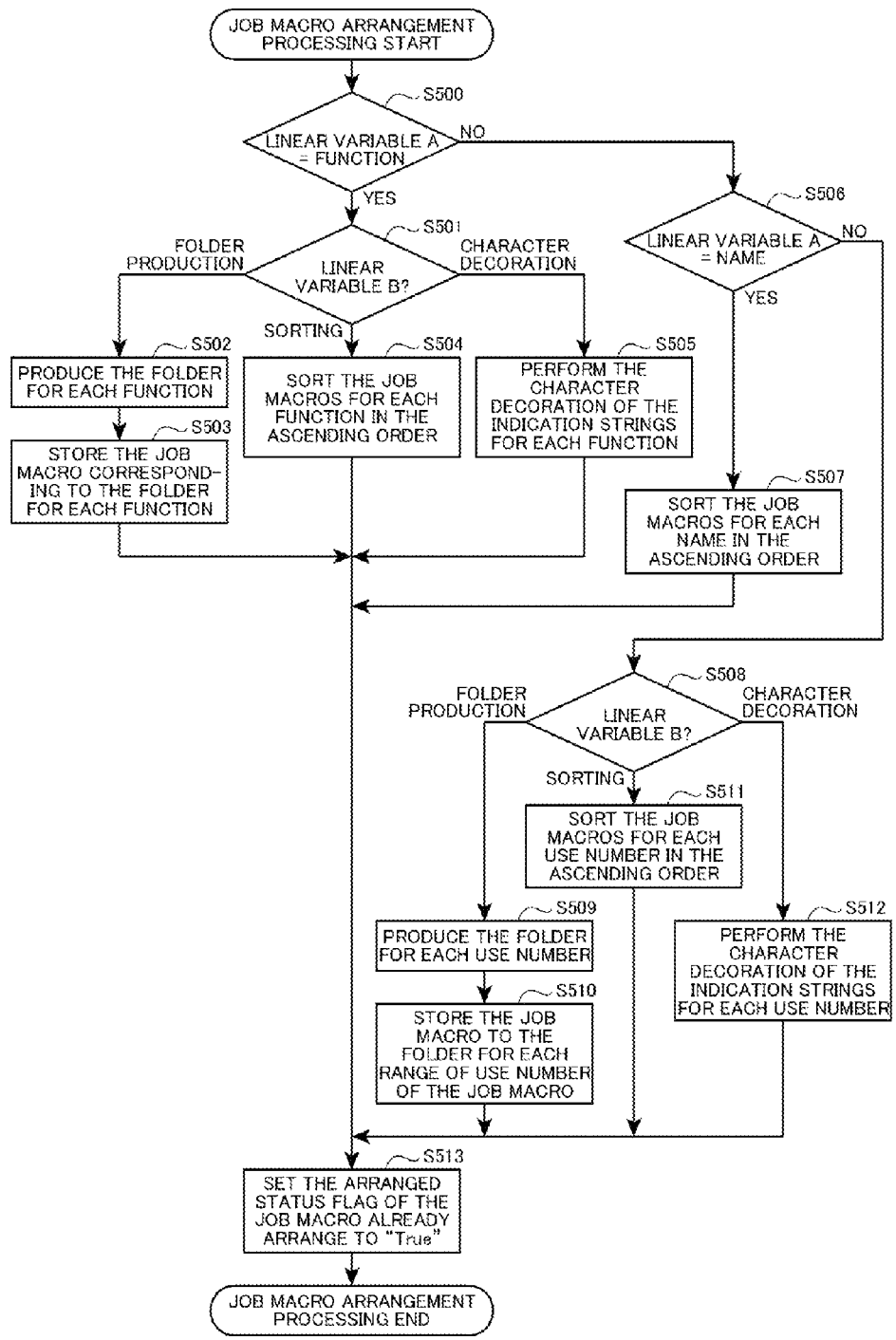
FIG. 13 is a second flowchart of the job macro arrangement processing done at an MFP according to a first embodiment of the invention.

The job macro arrangement processing done at the MFP in accompanying with the registration of the new job macro is described with reference to FIG. 1 and FIG. 13. It is to be noted that linear variables A, B in FIGS. 1, 13 are variables used for the processing done at the file arrangement controlling unit 112. The MFP 100 is in an idling state, which executes no functional processing, as a state prior to the execution of the flowchart shown in FIG. 1. An example that a new job macro is registered in the main folder MF1-1 for individual is described herein.

First, the file arrangement controlling unit 112 makes waiting until the user pushes down the job macro registration key such as, e.g., the job macro registration key KR shown in FIG. 10 on the function execution screen displayed on the operation panel 105 or, e.g., the function execution screen for the copy function shown in FIG. 10 (S401, S402).

When the job macro registration key is pushed down, the file arrangement controlling unit 112 looks up the table file TF1 of the main folder MF1-1 for individual in which the job macro is newly registered in this time after waiting for the completion of the job macro registration processing done by the job macro processing unit 111 (S403). The file arrangement controlling unit 112 counts the job macro number having the arranged status flag in a state of "False" from the table file TF1 (S404).

The file arrangement controlling unit 112 then retrieves "the threshold value" for the main folder MF1-1 for individual in which the job macro is newly registered in this time (or namely "the threshold value" set during the processing shown in FIG. 6 described above) out of the EEPROM 107 (the job macro setting information 107a) (S405).

The file arrangement controlling unit 112 compares the retrieved job macro number with the threshold value (S406). Where the job macro number is smaller than the threshold value, the file arrangement controlling unit 112 returns to operate at the above step S402 without doing the job macro arrangement processing, and where the job macro number is equal to or larger than the threshold value, the file arrangement controlling unit 112 operates from Step S407 described below in judging that the job macro arrangement processing is to be done.

The file arrangement controlling unit 112 retrieves "the arrangement item" (information set during the processing shown in FIG. 6 described above) out of the EEPROM 107 (the job macro setting information 107a) (S407). The file arrangement controlling unit 112 sets the retrieved contents of the arrangement items (any of "function," "name," and "use number") to be a linear variable A (S408 to S411).

The file arrangement controlling unit 112 retrieves "the arrangement means" (or information set during the processing shown in FIG. 6 described above) out of the EEPROM 107 (the job macro setting information 107a) (S412). The file arrangement controlling unit 112 sets the retrieved contents of the arrangement means (any of "folder production," "sorting," and "character decoration") to be a linear variable B (S413 to S416).

The file arrangement controlling unit 112 executes the job macro arrangement processing based on the linear variable A showing the retrieved arrangement items and the linear variable B showing the retrieved arrangement means, with respect to the main folder MF1-1 for individual (S417), thereby ending the processing or may return to Step S412 described above.

It is to be noted that the contents of the main folder MF1-1 for individual are in a state shown in FIG. 11, and it is described that the job macro number or the job macro file number located immediately beneath the main folder is equal to or larger than the threshold value (=5), and the operation shifts to the job macro arrangement processing at the above step S417. The job macro arrangement processing at the above step S417 is shown with the flowchart in FIG. 13.

The file arrangement controlling unit 112 confirms a combination of the linear variable A (the arrangement items) and the linear variable B (the arrangement means) (S500, S501, S506, S508), and performs the job macro arrangement processing corresponding to the combination (S502 to S505, S507, S509 to S512). Then, the file arrangement controlling unit 112 changes "the arranged status flag" of the table file TF1 with respect to the job macro subjecting to the arrangement of this time to be "True" (S417), and thereby ending the processing.

Hereinafter, the job macro arrangement processing of each combination of the linear variable A (the arrangement items) and the linear variable B (the arrangement means) will be described.

A: Function, B: Folder Production

In a case that A (the arrangement items) is "function" and B (the arrangement means) is "folder production," the file arrangement controlling unit 112 performs the processing at Steps S502, S503. In this case, the file arrangement controlling unit 112 produces subfolders for the respective functions (subfolders for each group with functions as keys) immediately beneath the main folder MF1-1 for individual at Step S502. The subfolders produced by the file arrangement controlling unit 112 are for functions whose subfolders are not yet produced and for only functions related to the job macros immediately beneath the main folder.

The file arrangement controlling unit 112 moves the job macro file immediately beneath the main folder to the produced subfolder, thereby renewing the table file TF1 or namely renewing the storing path.

Where the contents of the table file TF1 relating to the main folder MF1-1 for individual are in a state shown in FIG. 11 and where the processing at Steps S502, S503 described above is executed, the contents of the table file TF1 are as shown in FIG. 14B. At that time, the job macro main screen or the screen of the tab T101 for individual of the main folder MF1-1 is as shown in FIG. 14A. In the example shown in FIGS. 14A, 14B, the subfolders for "copy" and "fax" are produced immediately beneath the main folder MF1-1 for individual, and the job macros or the job macro files placed immediately beneath the main folder are sorted into the respective subfolders. In this processing, no subfolder for a function for non-existing job macro is produced, but an empty subfolder only may be produced.

A: Function, B: Sorting

In a case that A (the arrangement items) is "function" and B (the arrangement means) is "sorting," the file arrangement controlling unit 112 performs the processing at Step S504. In this case, the file arrangement controlling unit 112 makes sorting the job macros immediately beneath the main folder MF1-1 for individual with respect to each function at step S504 or renumbering "No." in the table file TF1.

Although the specific method for sorting the job macros with respect to the functions or ruling of sorting done by the file arrangement controlling unit 112 is not restricted, this embodiment may make sorting the macros in the ascending order with the function name or namely strings of the function names as the key (sorting key), e.g., in comparing values of the character codes sequentially from the first letter or the priority order with respect to the kinds of the characters. The file arrangement controlling unit 112 sorts the functions in the order of "copy," "fax," "print," and "scan."

Where the contents of the table file TF1 in association with the main folder MF1-1 for individual are in a state shown in FIG. 11 and where the processing at 5504 described above is executed, the contents of the table file TF1 are as shown in FIG. 15B. At that time, the job macro main screen or the screen of the tab T101 for individual of the main folder MF1-1 is as shown in FIG. 15A. In the example shown in FIG. 15, the job macros placed immediately beneath the main folder MF1-1 are sorted in the order of functions of "copy" and "fax." The file arrangement controlling unit 112 may apply, e.g., a relative order before sorting as it is for the job macros having the same function.

A: Function, B: Character Decoration

In a case that A (the arrangement items) is "function" and B (the arrangement means) is "character decoration," the file arrangement controlling unit 112 performs the processing at Step S505. In this case, the file arrangement controlling unit 112 controls the job macro processing unit 111 at Step S505 to change the character decoration, i.e., indication style of the letters with respect to the functions (or namely change of character decoration with respect to the groups using the functions as the key) for the indication of the respect job macros of the main folder MF1-1 for individual, or namely letters of job macro names structuring the display field F1—of the job macro main screen.

In this embodiment, it is described that the file arrangement controlling unit 112 controls the job macro processing unit 111 so as to change the indication style of the characters such as, e.g., underline, bold, italic, and character color for displaying the job macros with respect to the functions. It is to be noted that where the character decoration is changed, the file arrangement controlling unit 112 may register some parameters showing on and off of the character decoration in the EEPROM 107 or the job macro setting information 107a. The job macro processing unit 111 may display the job macro main screen based on the parameters.

Where the contents of the table file TF1 of the main folder MF1-1 for individual are in a state shown in FIG. 11, and where the processing of the above step S505 is executed, the job macro main screen or the screen of the tab T101 for individual of the main folder MF1-1 are as shown in FIG. 16A. The contents of the table file TF1 are as shown in FIG. 16B. In the example shown in FIG. 16A, the indication of the job macro for copy function or namely letter of the job macro name structuring the display field F10 shows an indication style with an underline. In the example shown in FIG. 16A, the indication of the job macro for fax function or namely letter of the job macro name structuring the display field F10 shows an indication style in italic letters.

A: Name, B: Sorting

In a case that A (the arrangement items) is "name" and B (the arrangement means) is "sorting," the file arrangement controlling unit 112 performs the processing at Step S507. In this case, the file arrangement controlling unit 112 makes sorting the job macros immediately beneath the main folder MF1-1 for individual with respect to the names as keys at Step S507 or renumbering "No." in the table file TF1.

Although the specific method for sorting the job macros with respect to the names or ruling of sorting done by the file arrangement controlling unit 112 is not restricted, this embodiment may make sorting the macros in the ascending order with the function name or namely strings of the function names as the key (sorting key), e.g., in comparing values of the character codes sequentially from the first letter or the priority order with respect to the kinds of the characters.

Where the contents of the table file TF1 in association with the main folder MF1-1 for individual are in a state shown in FIG. 11 and where the processing at S507 described above is executed, the contents of the table file TF1 are as shown in FIG. 17B. At that time, the job macro main screen or the screen of the tab T101 for individual of the main folder MF1-1 is as shown in FIG. 17A. In FIGS. 17A, 17B, it is shown in a way that the characters of symbols such as, e.g., "#," "@," have lower priorities than the alphabetical characters such as, e.g., A to Z.

A: Use Number, B: Folder Production

In a case that A (the arrangement items) is "use number" and B (the arrangement means) is "folder production," the file arrangement controlling unit 112 performs the processing at Steps S509, S510. In this case, the file arrangement controlling unit 112 produces subfolders for the respective ranges of the use numbers (subfolders for each group with use numbers as keys) immediately beneath the main folder MF1-1 for individual at Step S509. Although a specific method such as, e.g., ranges of the number of the produced subfolders, or the use number with respect to the subfolders, at a time that the file arrangement controlling unit 112 produces the subfolders with respect to the ranges of the use number is not restricted, this embodiment is described as producing two subfolders having the use number of 20 times or more and the use number less than 20 times.

The file arrangement controlling unit 112 transfers the job macro file located immediately beneath the main folder MF1-1 for individual to the produced subfolder, and renews the table file TF1 (or renews the storing path).

Where the contents of the table file TF1 relating to the main folder MF1-1 for individual are in a state shown in FIG. 11 and where the processing at Steps S509, S510 described above is executed, the contents of the table file TF1 are as shown in FIG. 18B. At that time, the job macro main screen or the screen of the tab T101 for individual of the main folder MF1-1 is as shown in FIG. 18A. In the example shown in FIG. 18A, the subfolders for "use number of 20 times or more" and "use number less than 20 times" are produced immediately beneath the main folder MF1-1 for individual, and the job macros or the job macro files placed immediately beneath the main folder are sorted into the respective subfolders.

It is to be noted that, in the file arrangement controlling unit 112, parameters used for sorting the job macros or the job macro files, such as, e.g., the number of the subfolders to be sorted, or the ranges of use numbers set to the respective subfolders, may be made changeable upon an entry of user's input through an input device not shown. The specific structure of the file arrangement controlling unit 112 for realizing the above input device is not limited, but may be formed with, e.g., the touch panel unit 203 displaying the input screen for entering the parameters by the user.

A: Use Number, B: Sorting

In that A (the arrangement items) is "use number" and B (the arrangement means) is "sorting," the file arrangement controlling unit 112 performs the processing at Step S511. In this case, the file arrangement controlling unit 112 makes sorting the job macros immediately beneath the main folder MF1-1 for individual with respect to the use numbers as keys at step S511 or renumbering "No." in the table file TF1.

Although the specific method for sorting the job macros with respect to the use numbers as keys or ruling of sorting done by the file arrangement controlling unit 112 is not particularly restricted, this embodiment may make sorting the macros in the descending order with the use numbers.

Where the contents of the table file TF1 in association with the main folder MF1-1 for individual are in a state shown in FIG. 11 and where the processing at S511 described above is executed, the contents of the table file TF1 are as shown in FIG. 19B. At that time, the job macro main screen or the screen of the tab T101 for individual of the main folder MF1-1 is as shown in FIG. 19A. In FIGS. 19A, 19B, the job macros immediately beneath the main folder MF1-1 for individual are sorted in the descending order of the use number.

A: Use Number, B: Character Decoration

In a case that A (the arrangement items) is "use number" and B (the arrangement means) is "character decoration," the file arrangement controlling unit 112 performs the processing at Step S512. In this case, the file arrangement controlling unit 112 controls the job macro processing unit 111 at Step S512 to change the character decoration with respect to the ranges of the use numbers or namely to change the character decoration with respect to the groups using the use numbers as the key, for the indication of the respect job macros of the main folder MF1-1 for individual, or namely letters of job macro names structuring the display field F1—of the job macro main screen.

Where the contents of the table file TF1 of the main folder MF1-1 for individual are in a state shown in FIG. 11, and where the processing of the above step S512 is executed, the job macro main screen or the screen of the tab T101 for individual of the main folder MF1-1 are as shown in FIG. 20A. The contents of the table file TF1 are as shown in FIG. 20B. In the example shown in FIG. 20A, the indication of the job macro for the use number of 20 times or more shows an indication style with italic letters. In the example shown in FIG. 20A, the indication of the job macro for the use number less than 20 times shows an indication style in an underline.

It is to be noted that, in the file arrangement controlling unit 112, parameters used for making the character decoration of the job macros or the job macro files, such as, e.g., kinds of the character decorations to be applied, or the ranges of use numbers set to the respective kinds of the character decorations, may be made changeable upon an entry of user's input through an input device not shown, in the same way as sorting to the subfolders as described above.

According to the first embodiment, the following advantages will be given. With the MFP 10 according to the first embodiment, the file arrangement controlling unit 112 judges based on "the threshold value" as to whether the job macro arrangement processing is required, in utilizing the new registration of the job macros, and performs the job macro arrangement processing according to the ruling information of the job macro arrangement processing set when judged as needed, or namely information of "the arrangement means" and "the arrangement items." With the MFP 100, the information of the judgment standard in association with the job macro arrangement processing or namely he information of "the threshold value" and the ruling information in association with the job macro arrangement processing or namely the information of "the arrangement means" and "the arrangement items" can be set in the EEPROM 107 or the job macro setting information 107a according to the user's manipulation With this structure, the MFP 100 can perform the job macro arrangement processing as the user expects.

The MFP 100 can change the sequence and the character decorations of the job macros displayed on the job macro main screen according to "the arrangement item" such as, e.g., use number, thereby improving user's usability upon disposing the display of the job macros that the user frequently uses at a portion or indication easily recognizable.

Second Embodiment

Hereinafter, referring to the drawings, an information processing apparatus and an image forming apparatus, according to the second embodiment, are described in detail. In this embodiment, the image forming apparatus having the information processing apparatus mounted according to the invention is exemplified as an example of an application to an MFP.

Referring to FIG. 2, again, a functional structure of an MFP 100A according to the second embodiment is described. The MFP 100A is different from that in the first embodiment with respect to that the controlling unit 109 or namely the file arrangement controlling unit 112 is replaced with a controlling unit 109A or namely a file arrangement controlling unit 112A.

The file arrangement controlling unit 112A according to the second embodiment is different from that in the first embodiment with respect to that the job macros in the main folder MF1-1 for individual are copied into the main folder MF2 for sharing according to the using state or the use number (hereinafter, referred to as "job macro copy processing").

That is, the file arrangement controlling unit 112A according to the second embodiment performs a processing for copying the job macros satisfying certain conditions from the main folder MF1-1 for individual as a first main folder to the main folder MF2 for sharing as a second main folder. Although the conditions of the job macros subject to the job macro copying processing done at the file arrangement controlling unit 112A are not restricted, the job macros having the use number equal to or more than the threshold value such as, e.g., 50 time or more, in the main folder MF1-1 for individual are made copied to the main folder MF2 for sharing in this embodiment.

As described above, in the second embodiment, the file arrangement controlling unit 112A functions as a file copying means. In operation, the operation of the MFP 100A in the second embodiment, which is different from that of the first embodiment, is described.

First, a processing for job macro arrangement setting done by the file arrangement controlling unit 112A according to the second embodiment is described. The processing for job macro arrangement setting done by the file arrangement controlling unit 112A can be described using the flowchart shown in FIG. 6 in the same way as in the first embodiment.

Figure 21:
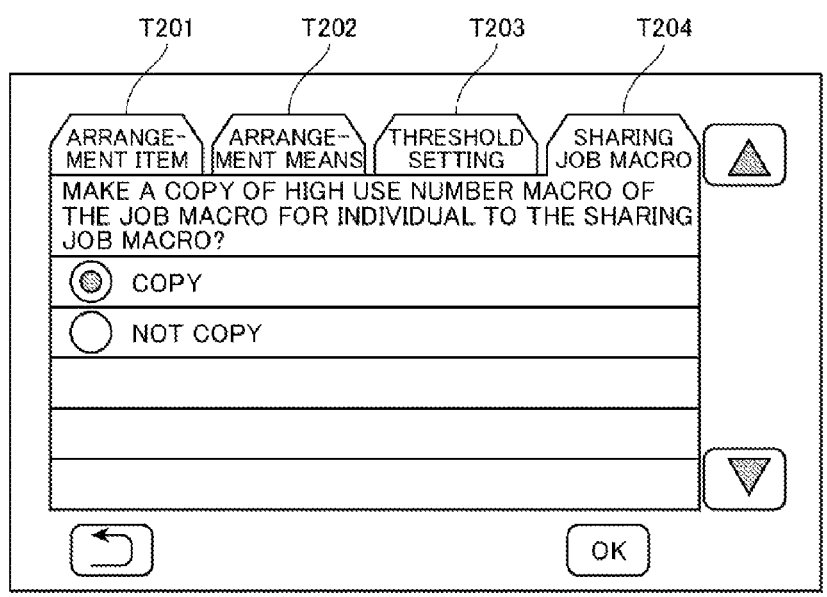
FIG. 21 is a diagram showing a control panel displayed at a touch panel portion in a case where an MFP according to a second embodiment does processing of setting the job macro arrangement.

On the operation screen for setting the job macro arrangement setting according to the second embodiment, the difference is, as shown in FIG. 21, that a tab T204 allowing a setting to select as to whether the job macro copy processing is done or not ("copy" or "not copy") (hereinafter, referred to as "sharing job macro copy setting") is added. The file arrangement controlling unit 112A sets the job macro copy processing to be turned on when the "copy" is selected and to be turned off when the "not copy" is selected, on the tab T204 for setting the sharing job macro copy setting.

When doing the processing shown in FIG. 6 described above, the file arrangement controlling unit 112A according to the second embodiment receives selection entries of "the arrangement items," "the arrangement means," "the threshold value," and "the sharing job macro copy setting" (respective setting values of tabs T201 to T204) at Step S102. When doing the processing shown in FIG. 6 described above, the file arrangement controlling unit 112A according to the second embodiment performs a processing to write the respective setting values of "the arrangement items," "the arrangement means," "the threshold value," and "the sharing job macro copy setting" in the EEPROM 107 or namely the job macro setting information 107a at Step S104.

Next, the job macro arrangement processing done in accompany with the new job macro registration at the MFP 100A is described. In the controlling unit 109A or the file arrangement controlling unit 112A according to the second embodiment, what is different from that in the first embodiment is the processing in the flowchart in FIG. 1 is replaced with a processing of the contents shown in FIG. 22.

Figure 22:
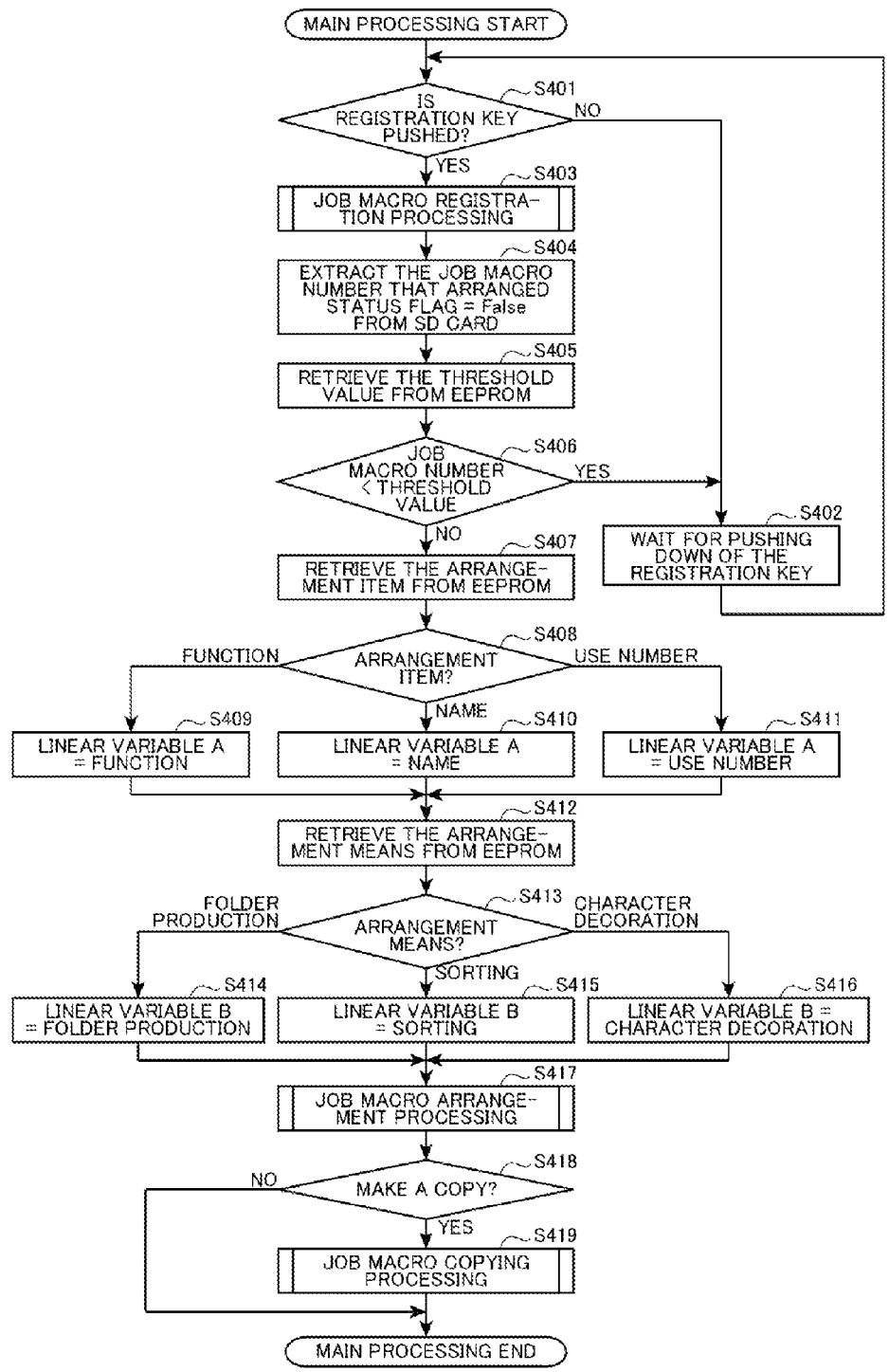
FIG. 22 is a flowchart showing a processing for a job macro arrangement in association with registration of a new job macro done at the MFP according to the second embodiment.
Figure 23:
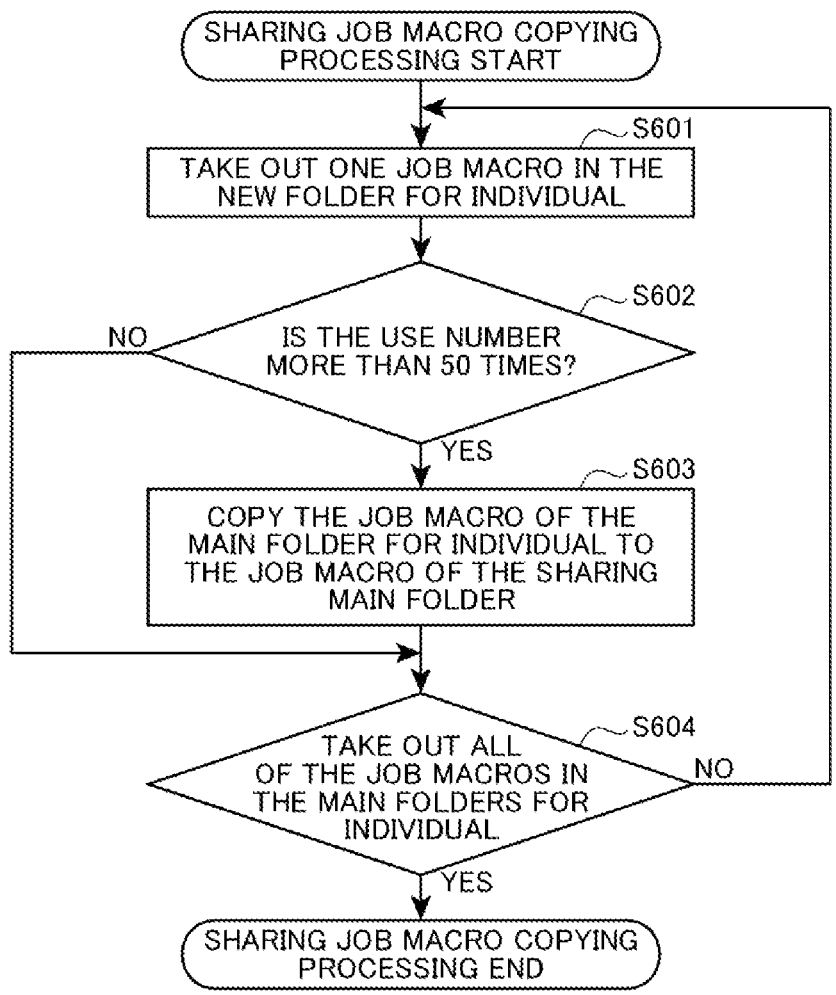
FIG. 23 is a flowchart showing a job macro copying processing done at the MFP according to the second embodiment.

In FIG. 22, Steps for performing substantially the same processing as those in the first embodiment are given with the same step numbers. In FIG. 22, what is different is a processing at steps S418, S419 (job macro copy processing) added to the processing shown in FIG. 1 described above.

After the job macro arrangement processing at Step S417, the file arrangement controlling unit 112A confirms at Step S418 as to whether the function of the job macro copy processing is turned on or off. If the function of the job macro copy processing is turned on, the file arrangement controlling unit 112A executes the job macro copy processing upon proceeding to Step S419 described below, and if the function of the job macro copy processing is turned off, the file arrangement controlling unit 112A ends the processing without executing the job macro copy processing.

The file arrangement controlling unit 112A performs the job macro copy processing at Step S419 according to the flowchart shown in FIG. 22. First, the file arrangement controlling unit 112A looks up the table file TF1 of the main folder MF1-1 for individual and selects one of the job macros in the main folder MF1-1 for individual (S601). The file arrangement controlling unit 112A compares the use number of the retrieved job macro with the threshold value, i.e., 50 times (S602).

If the use number of the retrieved job macro is more than the threshold value, i.e., 50 times, the file arrangement controlling unit 112A performs the processing for copying the job macro to a place immediately beneath the main folder MF2 for sharing, or namely for copying the job macro file and renewing the table files TF1, TF2 (S603). This threshold value may be registered in the EEPROM 107 or the job macro setting information 107a upon receiving entries of the user in advance, or a prescribed number may be set in the file arrangement controlling unit 112A.

To the contrary, if the use number of the retrieved job macro is equal to or less than the threshold value, i.e., 50 times, or if the job macro copy processing is completed, the file arrangement controlling unit 112A confirms as to whether all the job macros in the main folder MF1-1 for individual are already processed or not yet (S604). If all the job macros are already processed, the file arrangement controlling unit 112A ends the job macro copy processing, and if unprocessed job macros are remaining, the unit operates upon returning to the processing at Step S602 for the processing relating to the subsequent unprocessed job macros.

Hereinafter, a specific example for the job macro copy processing is described. It is assumed that at an initial stage, the contents of the table file TF1 of the main folder MF1-1 for individual are the contents shown in FIG. 5. It is described that the job macros in the main folder MF2 for sharing are not registered at the initial stage.

In such a case, according to the processing in the flowchart shown in FIG. 22 described above, the file arrangement controlling unit 112A extracts the job macro whose "No." is one as the job macro having the use number more than 50 times, from the main folder MF1-1, and performs copying to the main folder MF2 for sharing. Consequently, the table file TF1 of the main folder MF1-1 for individual after the job macro copy processing is shown in FIG. 24A, whereas the table file TF2 for sharing of the main folder MF2 for sharing is shown in FIG. 24B. FIGS. 24A, 24B show a situation that the function of the job macro copy processing is set to be turned off until the use number of the job macro having "No." of one reaches "54" in the controlling unit 109A or namely the file arrangement controlling unit 112AA (set to "not copy" in FIG. 21), and that when the use number of the job macro having "No." of one reaches "54," the function of the job macro copy processing is turned on (set to "copy" in FIG. 21).

According to the second embodiment, the following advantages are given in addition to the advantages of the first embodiment. With the MPF 100A of the second embodiment, the job macros satisfying the prescribed condition or conditions such as, e.g., that the use number is the threshold value or more, are subject to the processing of copying from the main folder MF1-1 for individual to the main folder MF2 for sharing. With this processing, in the MFP 100A, the highly used job macros in the main folder MF1-1 for individual are shared upon copying in the main folder MF2 for sharing, thereby promoting usability because the macros can be used among the respective users.

This invention is not limited to the above embodiments, and can be used for modifications as exemplified below.

Although in the above embodiments, the information processing apparatus is exemplified as applied to the image forming apparatus or MFP managing the job macros using the job macro files, the information processing apparatus is applicable to other apparatuses doing the file management using other file system such as, e.g., information processing apparatuses such as printers, facsimile machines, personal computers.

Figure 25:
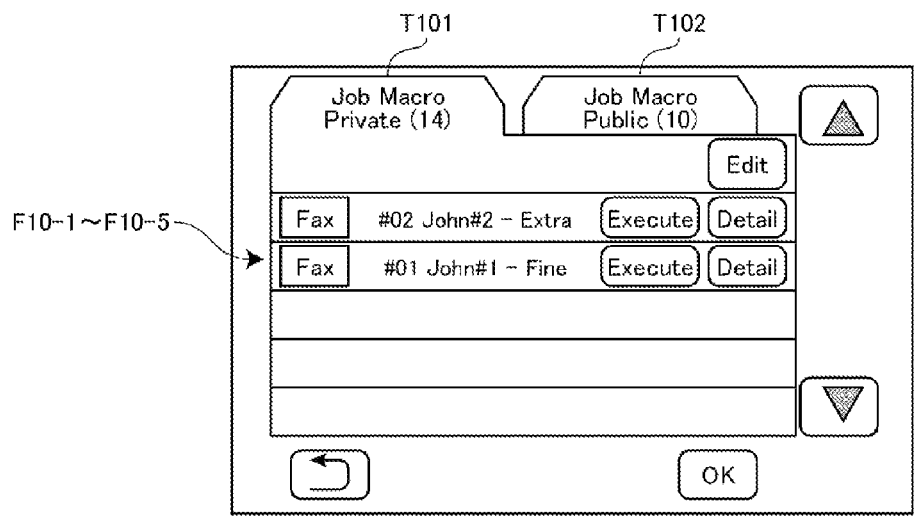
FIG. 25 is a first diagram showing an example of a job macro main screen displayed at the touch panel portion of an MFP according to a modification of the first embodiment.

With the MFP 100 according to the first embodiment, where any function key of the first hardware key unit 201 is pushed down during displaying the job macro main screen at the touch panel unit 203, the controlling unit 109 or namely the job macro processing unit 111 may display only the job macros relating to the function at the display fields F10-1 to F10-5. For example, where the copy function button 201*a* is pushed down while the display fields F10-1 to F10-5 show the state in FIG. 3, the controlling unit 109 or namely the job macro processing unit 111 may display only the job macros relating to the copy function at the display fields F10-1 to F10-5 as shown in FIG. 25. With the MFP 100 according to the first embodiment, where the job macro key 202*b* is pushed down during displaying the execution screen for any function, the controlling unit 109 or namely the job macro processing unit 111 may display the job macro main screen displaying only the job macros relating to the function in substantially the same way.

With the MFP 100 according to the first embodiment, where the processing contents at a time that the function is executed in the past (the contents substantially the same as the information structuring the job macros) are stored as past record information in the EEPROM 107 or namely the job macro setting information 107*a*, the past record information corresponding to the user's manipulation such as, e.g., a manipulation to the operation screen presenting a list of the past record information and rendering the use choose the information, may be registered as a new job macro (job file) in the SD card 108*a*. In the MFP 100 according to the first embodiment, the contents of the function execution done immediately before in accordance with the user's manipulation such as, e.g., pushing down of a certain button may be registered as a new job macro (job file) in the SD card 108*a*.

Figure 26:
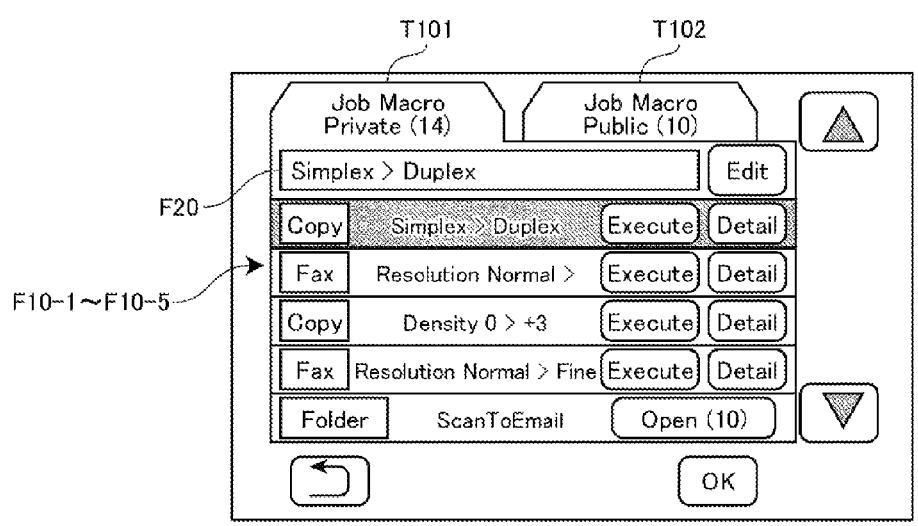
FIG. 26 is a second diagram showing the example of the job macro main screen displayed at the touch panel portion of the MFP according to the modification of the first embodiment.

With the MFP 100 according to the first embodiment, it is described that the respective job macro names or file names may be entered by the user or given after names based on the contents of the job macro, but the name of the job macros may be entered with plural input modes. For example, the MFP 100 is structured to respond two input modes, a normal mode for inputting the job macro name manually, and an automatic mode that the controlling unit 109 or namely the job macro processing unit 111 provides a name based on the contents of the job macro, which are switchable according to the user's manipulation.

Where the MFP 100 operates in the automatic mode, the controlling unit 109 or namely the job macro processing unit 111 may extract items changed from the default setting such as, e.g., a setting of the initial state of the function execution screen, with respect to the job macros to which the name is given, and may reflect the contents of the items to the name of the job macros. For example, in a case of the job macro having a changed setting "Simples>Duples" (double side printing from single side original document) where the default setting is "Simples>Simples" (single side printing from single side original document), the job macro may include, in its job macro name, a string of "Simples>Duples." The means for displaying the given job macro name may be done with a field or fields F20 on the job macro main screen as shown in FIG. 26.

Although in the MFP 100 according to the first embodiment, plural job macros for the respective functions are made registerable, the MFP may be structured in making only one job macro registerable with respect to each function, and the job macro for each function is read out with the function key corresponding to the first hardware key unit 201 and is made switchable to an operation mode for executing the function. In a case of the operation under the operation mode, the controlling unit 109 or namely the job macro processing unit 111 may read out and execute the job macro of the function corresponding to the incident function key where the job macro key 202*b* is pushed down after, e.g., pushing down of any function key.

Although in the MFP 100 according to the first embodiment, the example for producing the subfolders with respect to the functions in a case that the arrangement means is "subfolder production" is described, it is not limited to producing the subfolders for all of the functions, but the MFP may produce specific subfolders for some portion of the functions and produce subfolders for other functions, i.e., functions not producing the specific subfolders. For example, with the MFP 100 according to the embodiment, where the user selects "arrangement items=function," and "arrangement means=subfolder," one certain specific function folder, e.g., copy folder and one folder other than specific functions, e.g., a folder other than copy, may be arranged according to the user's operation. With the MFP 100 according to the embodiment, one certain specific function folder, e.g., copy folder and no folder for functions other than specific functions may be arranged according to the user's operation. Furthermore, with the MFP 100 according to the embodiment, main folders subject to the arrangement may be designated during the file arrangement processing, and the arrangement means may be made changeable with respect to the respective main folders.

In the above embodiments, the contents of the respective items of the information set in the job macro setting information 107*a* are not limited. For example, possible values of the "arrangement items" and "arrangement means" are not limited to those in the above embodiments.

For example, with the above embodiments, the "arrangement means" can be any one of "subfolder production," "sorting," and "character decoration," but the means may be allowed to correspond to at least one of three. Similarly, with the above embodiments, the "arrangement items" can be any one of function," "name," and "use number," but the items may be allowed to correspond to at least one of three.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:
1. An information processing apparatus comprising:
   a manipulating unit for receiving an instruction based on a user manipulation and outputting an instruction signal;
   a setting unit for setting an arrangement item and an arrangement means for arranging a file or files based on the instruction signal from the manipulating unit;
   a detecting unit for detecting a file number; and a controlling unit for arranging the file or files based on the arrangement item and the arrangement means set with the setting unit in response to determining that the file number exceeds a threshold value, wherein the arrangement item includes a first arrangement item and a second arrangement item, wherein the arrangement means includes a first arrangement means and a second arrangement means, wherein the first arrangement means is a means for producing a folder and storing a prescribed file in the folder, wherein the second arrangement means is a means for sorting the files, and wherein the setting unit sets either the first arrangement item or the second arrangement item, the setting unit sets either the first arrangement means or the second arrangement means.

2. The information processing apparatus according to claim 1, wherein the arrangement means further includes a third arrangement means, wherein the third arrangement means is a means for decorating characters of a file name to be displayed, and wherein the setting unit sets one of the first arrangement means, the second arrangement means, or the third arrangement means.

3. The information processing apparatus according to claim 1, wherein the setting unit sets the threshold value according to the instruction signal outputted from the manipulating unit.

4. The information processing apparatus according to claim 1, wherein the detecting unit detects the file number in a specific folder.

5. The information processing apparatus according to claim 4, wherein the first arrangement means is a means for producing a subfolder in the specific folder and stores in the subfolder a prescribed file provided in the specific folder.

6. The information processing apparatus according to claim 1, wherein the second arrangement means is a means for sorting files displayed with a first order in a list sequentially from the first order to a second order.

7. The information processing apparatus according to claim 1, wherein the first arrangement item is a use frequency of the file, and wherein the second arrangement item is a name of the file.

8. The information processing apparatus according to claim 1, wherein the file is a job macro file indicating instruction contents corresponding to an instruction based on a series of user's manipulations.

9. The information processing apparatus according to claim 8, wherein the controlling unit copies the job macro file to an existing shared folder in a case where a use frequency of the job macro file exceeds a prescribed number of times.

* * * * *